(12) United States Patent
Kawano et al.

(10) Patent No.: US 10,720,154 B2
(45) Date of Patent: Jul. 21, 2020

(54) INFORMATION PROCESSING DEVICE AND METHOD FOR DETERMINING WHETHER A STATE OF COLLECTED SOUND DATA IS SUITABLE FOR SPEECH RECOGNITION

(71) Applicant: SONY CORPORATION, Tokyo (JP)

(72) Inventors: Shinichi Kawano, Tokyo (JP); Yuhei Taki, Kanagawa (JP); Takashi Shibuya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/535,101

(22) PCT Filed: Sep. 15, 2015

(86) PCT No.: PCT/JP2015/076083
§ 371 (c)(1),
(2) Date: Jun. 12, 2017

(87) PCT Pub. No.: WO2016/103809
PCT Pub. Date: Jun. 30, 2016

(65) Prior Publication Data
US 2017/0345423 A1 Nov. 30, 2017

(30) Foreign Application Priority Data

Dec. 25, 2014 (JP) ................................. 2014-261702

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/02* (2013.01); *G10L 15/04* (2013.01); *G10L 15/222* (2013.01);
(Continued)

(58) Field of Classification Search
USPC .................................. 704/231–257, 270–275
See application file for complete search history.

(56) References Cited

U.S. PATENT DOCUMENTS 6,832,194 B1 * 12/2004 Mozer ..................... G10L 15/28
704/213
7,917,356 B2 * 3/2011 Chen ....................... G10L 25/78
704/208
(Continued)

FOREIGN PATENT DOCUMENTS

| CN | 101042866 A | 9/2007 |
| JP | 11-133849 | * 5/1999 |

(Continued)

OTHER PUBLICATIONS

International Search Report and Written Opinion of PCT Application No. PCT/JP2015/076083, dated Dec. 15, 2015, 02 pages of English Translation and 08 pages of ISRWO.

*Primary Examiner* — Jesse S Pullias
(74) *Attorney, Agent, or Firm* — Chip Law Group

(57) ABSTRACT

Provided is an information processing device including: a collected sound data acquisition portion that acquires collected sound data; and an output controller that causes an output portion to output at least whether or not a state of the collected sound data is suitable for speech recognition.

21 Claims, 22 Drawing Sheets

(51) Int. Cl.
*G10L 15/04* (2013.01)
*G10L 15/28* (2013.01)
*G10L 15/02* (2006.01)

(52) U.S. Cl.
CPC ........ *G10L 15/28* (2013.01); *G10L 2015/025* (2013.01); *G10L 2015/221* (2013.01); *G10L 2015/225* (2013.01)

(56) References Cited

U.S. PATENT DOCUMENTS

| | | | | |
|---|---|---|---|---|
| 2003/0212548 | A1* | 11/2003 | Petty | G10L 19/00 704/201 |
| 2005/0038651 | A1* | 2/2005 | Zhang | G10L 25/78 704/233 |
| 2007/0225982 | A1 | 9/2007 | Washio | |
| 2010/0208065 | A1* | 8/2010 | Heiner | G06F 3/011 348/143 |
| 2010/0232620 | A1* | 9/2010 | Matsuo | H04S 7/30 381/92 |
| 2013/0339027 | A1* | 12/2013 | Dokor | G06F 17/20 704/275 |
| 2014/0304606 | A1 | 10/2014 | Ohmura | |

FOREIGN PATENT DOCUMENTS

| | | | |
|---|---|---|---|
| JP | 11-133849 | A | 5/1999 |
| JP | 2000-75893 | A | 3/2000 |
| JP | 2000-322078 | * | 11/2000 |
| JP | 2000-322078 | A | 11/2000 |
| JP | 2001-343996 | * | 12/2001 |
| JP | 2001-343996 | A | 12/2001 |
| JP | 2005-17932 | A | 1/2005 |
| JP | 2007-256482 | A | 10/2007 |
| JP | 2009-069707 | * | 4/2009 |
| JP | 2009-69707 | A | 4/2009 |
| JP | 2014-202857 | A | 10/2014 |

* cited by examiner

FIG. 4
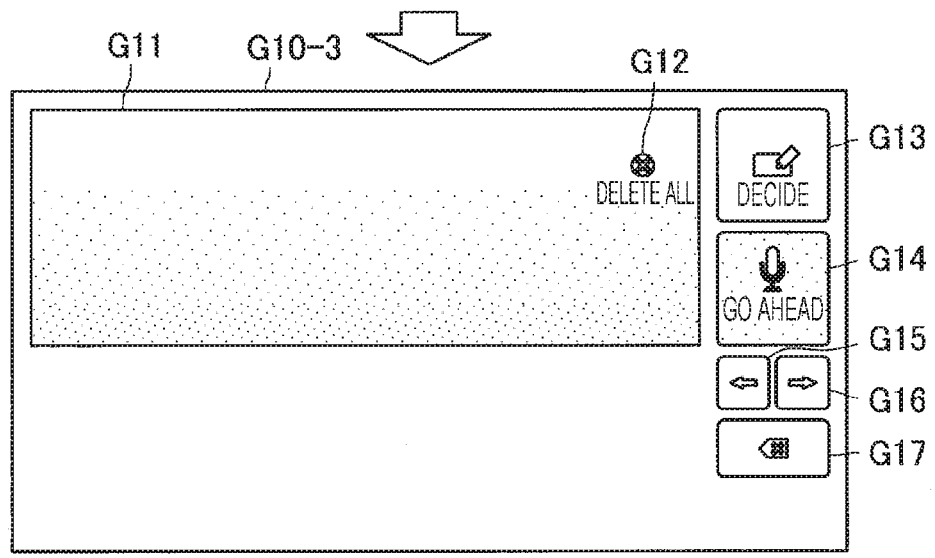
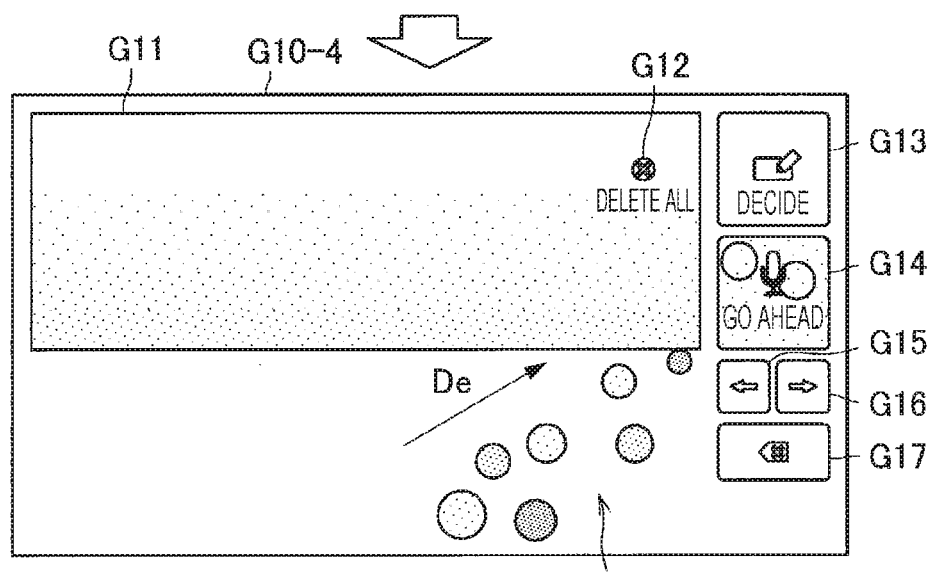
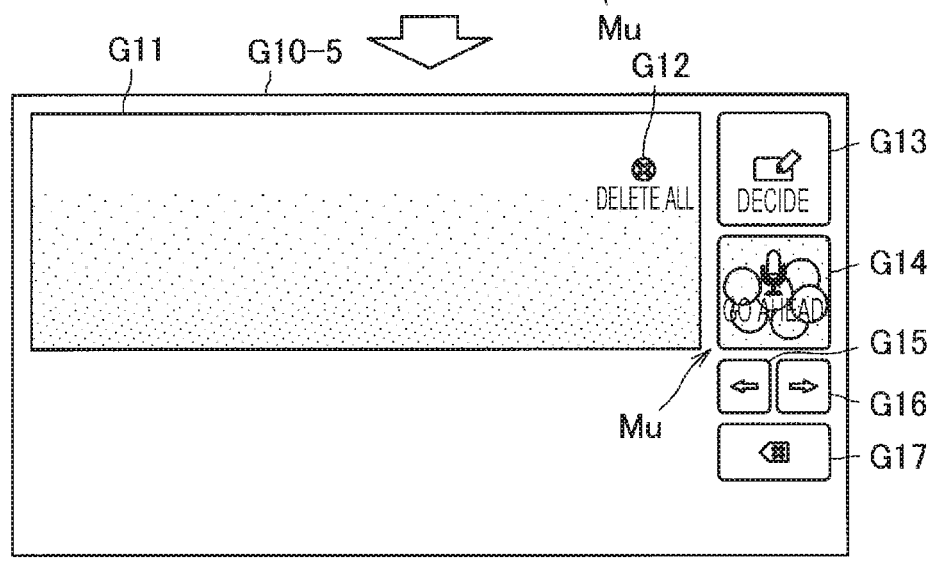

FIG. 8
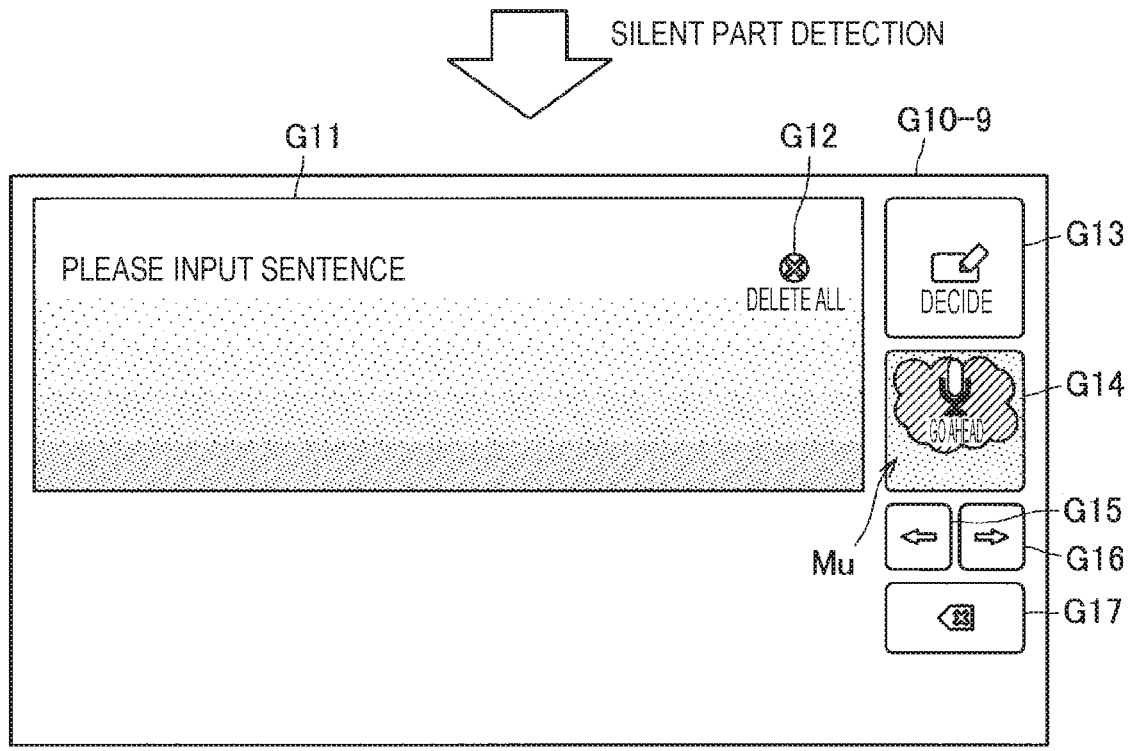
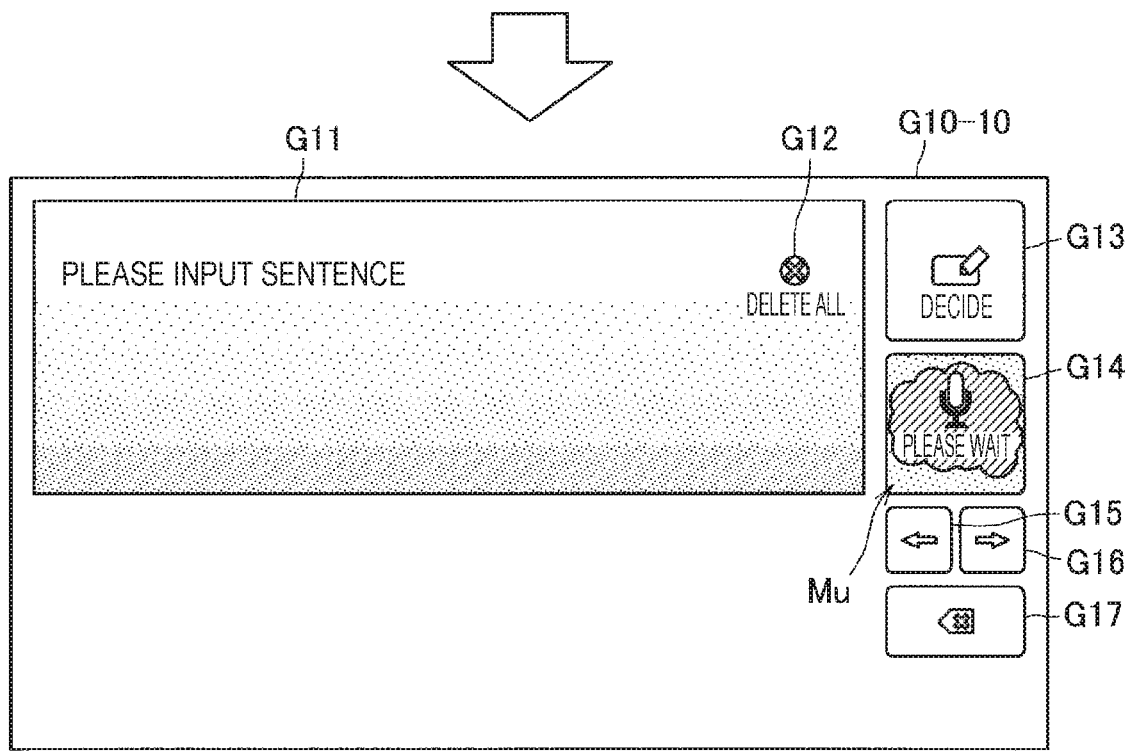

FIG. 9
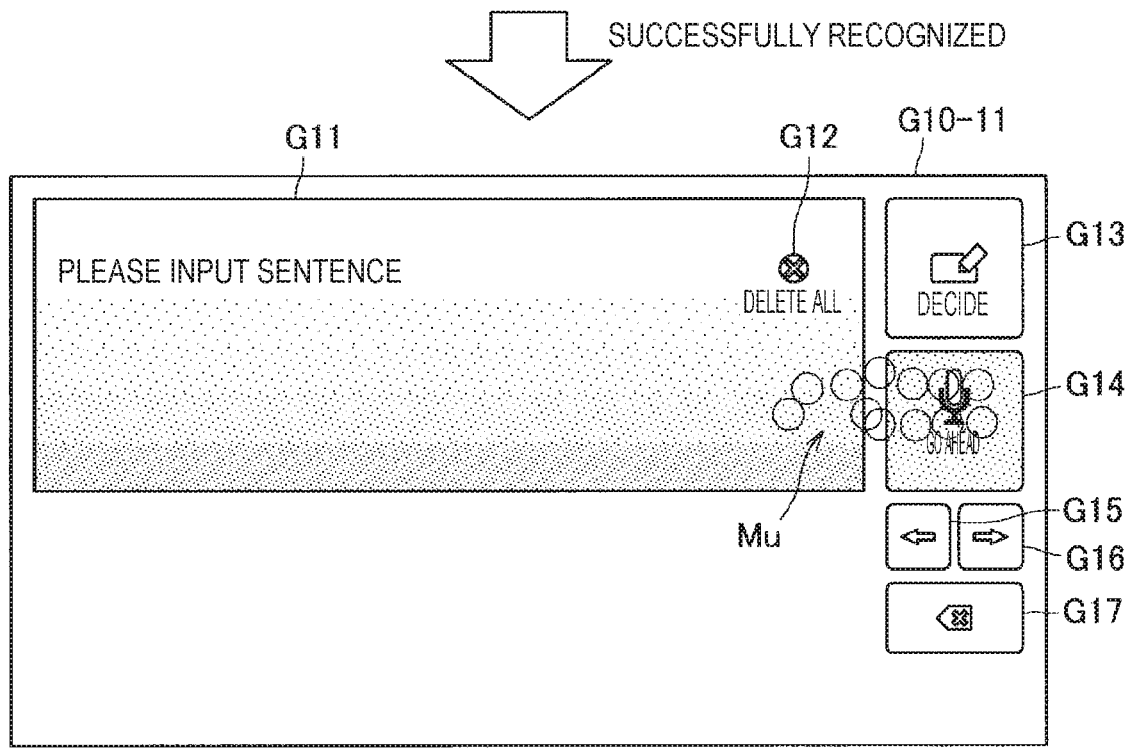
SUCCESSFULLY RECOGNIZED
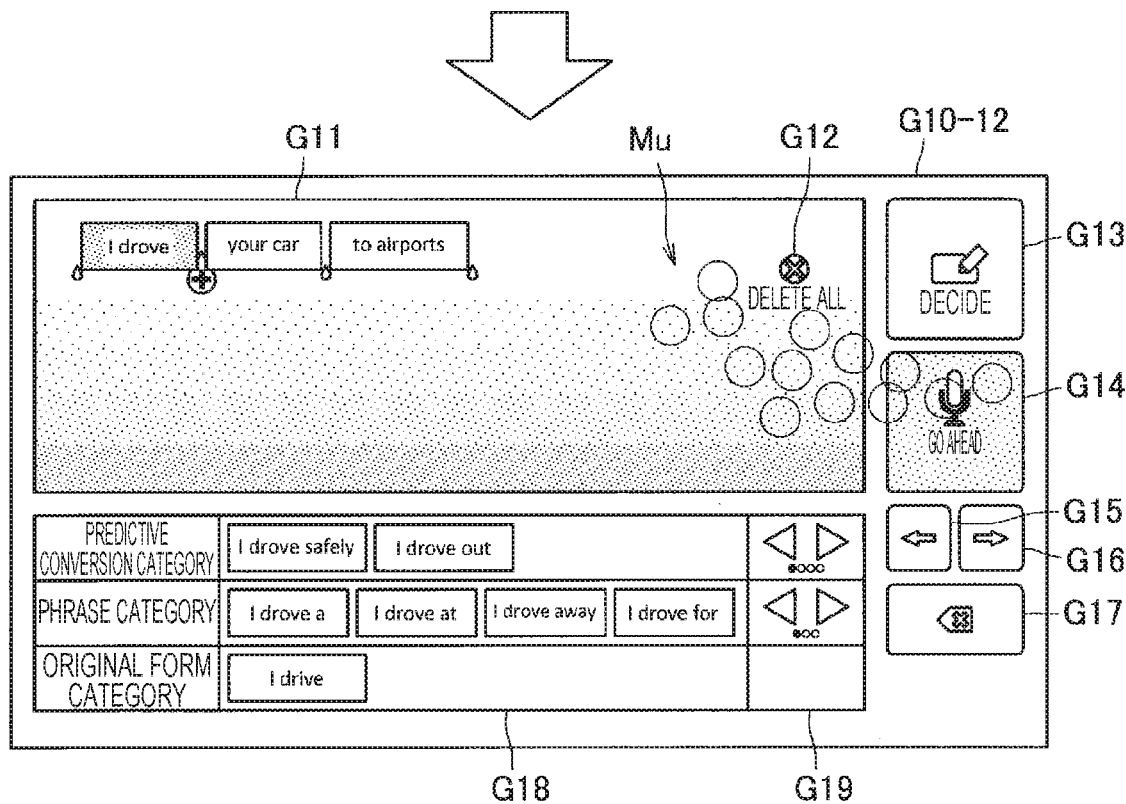

FIG. 10
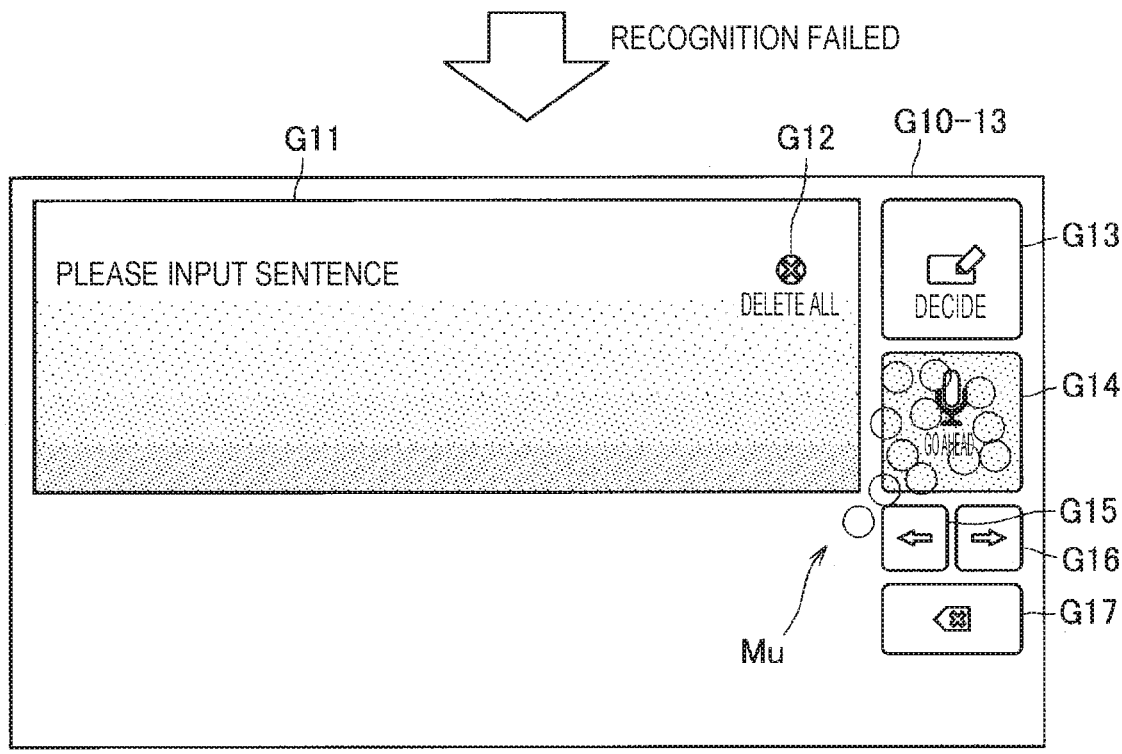
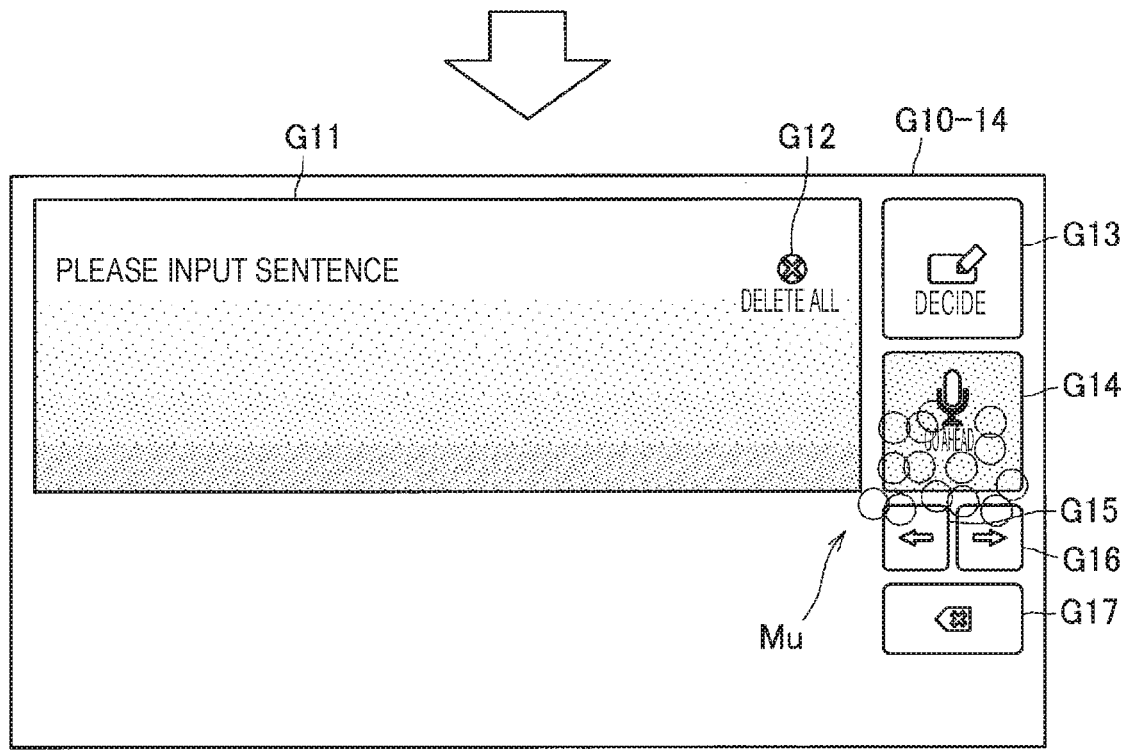

FIG. 16

| START WORD REGISTRATION DB | | |
|---|---|---|
| 〜〜 | What | |
| | at | 〜〜 |
| | foot | 〜〜 |
| 〜〜 | Why | |
| ... | ... | |

| SENTENCE PUNCTUATION DETERMINATION WORD DB | |
|---|---|
| 〜〜 | isn't it. |
| 〜〜 | What |
| 〜〜 | Why |
| ... | ... |

| PERMISSION WORD DB | | |
|---|---|---|
| What | | |
| | at | 〜〜 |
| | foot | 〜〜 |

INFORMATION PROCESSING DEVICE AND METHOD FOR DETERMINING WHETHER A STATE OF COLLECTED SOUND DATA IS SUITABLE FOR SPEECH RECOGNITION

CROSS REFERENCE TO RELATED APPLICATIONS

This application is a U.S. National Phase of International Patent Application No. PCT/JP2015/076083 filed on Sep. 15, 2015, which claims priority benefit of Japanese Patent Application No. JP 2014-261702 filed in the Japan Patent Office on Dec. 25, 2014. Each of the above-referenced applications is hereby incorporated herein by reference in its entirety.

TECHNICAL FIELD

The present disclosure relates to an information processing device, a method of information processing, and a program.

BACKGROUND ART

In recent years, there has been a technique of recognizing character strings by acquiring data of sound collected by a microphone (hereinafter, also simply referred to as "collected sound data") and performing speech recognition on the collected sound data. For example, an example of a method of constructing context acoustic models for speech recognition has been disclosed (see Patent Literature 1, for example).

CITATION LIST

Patent Literature

Patent Literature 1: JP 2001-195084A

DISCLOSURE OF INVENTION

Technical Problem

However, it is desirable to provide a technology that can improve accuracy of speech recognition for collected sound data.

Solution to Problem

According to the present disclosure, there is provided an information processing device including: a collected sound data acquisition portion that acquires collected sound data; and an output controller that causes an output portion to output at least whether or not a state of the collected sound data is suitable for speech recognition.

According to the present disclosure, there is provided a method of information processing, including: acquiring collected sound data; and causing an output portion to output at least whether or not a state of the collected sound data is suitable for speech recognition.

According to the present disclosure, there is provided a program that causes a computer to function as an information processing device including: a collected sound data acquisition portion that acquires collected sound data; and an output controller that causes an output portion to output at least whether or not a state of the collected sound data is suitable for speech recognition.

Advantageous Effects of Invention

According to the present disclosure, the technology that can improve accuracy of speech recognition for collected sound data is provided as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of transition of a screen displayed by the output portion 130 until termination of collected sound data that is a target of speech recognition is determined from display of an initial screen.

FIG. 8 is a diagram illustrating an example of display when a silent part is detected.

FIG. 9 is a diagram illustrating an example of display when the speech recognition is successfully performed.

FIG. 10 is a diagram illustrating an example of display when the speech recognition fails.

FIG. 16 is a diagram illustrating configuration examples of various DBs.

MODE(S) FOR CARRYING OUT THE INVENTION

Figure 1:
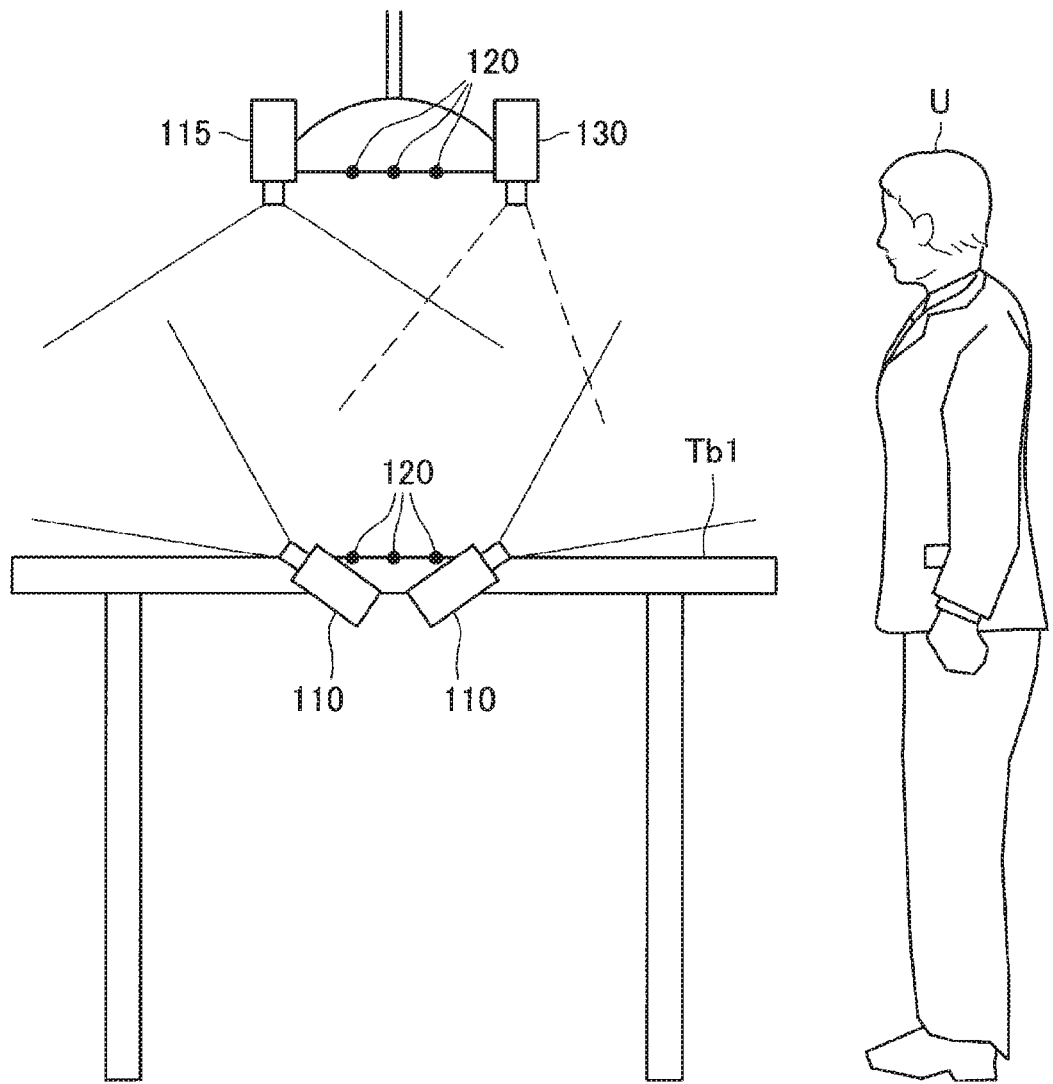
FIG. 1 is a diagram illustrating a configuration example of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Description will be given in the following order.
1. Embodiment of present disclosure
1.1 System configuration example
1.2 Functional configuration example
1.3 Functional details of information processing system
1.4 Modification example of aptitude determination for speech recognition
1.5 Modification example of display form
1.6 Hardware configuration example
2. Conclusion

1. EMBODIMENT OF PRESENT DISCLOSURE

[1.1. System Configuration Example]

A configuration example of an information processing system 10 according to an embodiment of the present disclosure is described with reference to the drawings. FIG. 1 is a diagram illustrating a configuration example of the information processing system 10 according to an embodiment of the present disclosure. As illustrated in FIG. 1, the information processing system 10 according to the embodiment of the present disclosure is configured to include an image input portion 110, an operation input portion 115, a sound collecting portion 120, and an output portion 130. The information processing system 10 is capable of performing speech recognition on the speech uttered by a user U (hereinafter also simply referred to as "user"). In the following description, voice or speech and sound are distinctly used.

The image input portion 110 has a function of inputting an image. In the example illustrated in FIG. 1, the image input portion 110 includes two cameras embedded in a table Tbl. However, the number of cameras included in the image input portion 110 is not limited to the particular number as long as it is one or more. In such a case, the position where each of one or more cameras included in the image input portion 110 is provided is also not limited to a particular position. In addition, one or more cameras may include a monocular camera or a stereo camera.

The operation input portion 115 has a function of inputting an operation of the user U. In the example illustrated in FIG. 1, the operation input portion 115 includes one camera suspended from the ceiling above the table Tbl. However, the position at which the camera included in the operation input portion 115 is provided is not limited to a particular position. In addition, the camera may include a monocular camera or a stereo camera. In addition, the operation input portion 115 may be anything other than a camera as long as it has a function of inputting the operation of the user U, and may be, for example, a touch panel or a hardware button.

The output portion 130 has a function of displaying a screen on the table Tbl. In the example illustrated in FIG. 1, the output portion 130 is suspended from the ceiling above the table Tbl. However, the position at which the output portion 130 is provided is not limited to a particular position. In addition, the output portion 130 may typically be a projector capable of projecting a screen onto the top surface of the table Tbl, but it may be other types of display as long as it has a function of displaying a screen.

Moreover, although the case where the top surface of the table Tbl is the display surface of the screen is mainly described herein, the display surface of the screen may be other than the top surface of the table Tbl. An example of the display surface of the screen may include a wall, a building, a floor surface, a ground surface, a ceiling, or a surface at other place. In addition, in the case where the output portion 130 has its own display surface, the display surface of the screen may be a display surface of the output portion 130.

The sound collecting portion 120 has a function of collecting sound. In the example illustrated in FIG. 1, the sound collecting portion 120 includes a total of six microphones, that is, three microphones above the table Tbl and three microphones present on the upper surface of the table Tbl. However, the number of microphones included in the sound collecting portion 120 is not limited to the particular number as long as it is one or more. In such a case, the position where one or more microphones included in the sound collecting portion 120 are provided is also not limited to a particular position.

However, if the sound collecting portion 120 includes a plurality of microphones, an arrival direction of sound can be estimated on the basis of collected sound data collected by each of the plurality of microphones. If the sound collecting portion 120 includes a microphone with directivity, the arrival direction of sound can be estimated on the basis of collected sound data collected by the microphone with directivity.

The above description is given as to the configuration example of the information processing system 10 according to an embodiment of the present disclosure.

[1.2. Functional Configuration Example]

Figure 2:
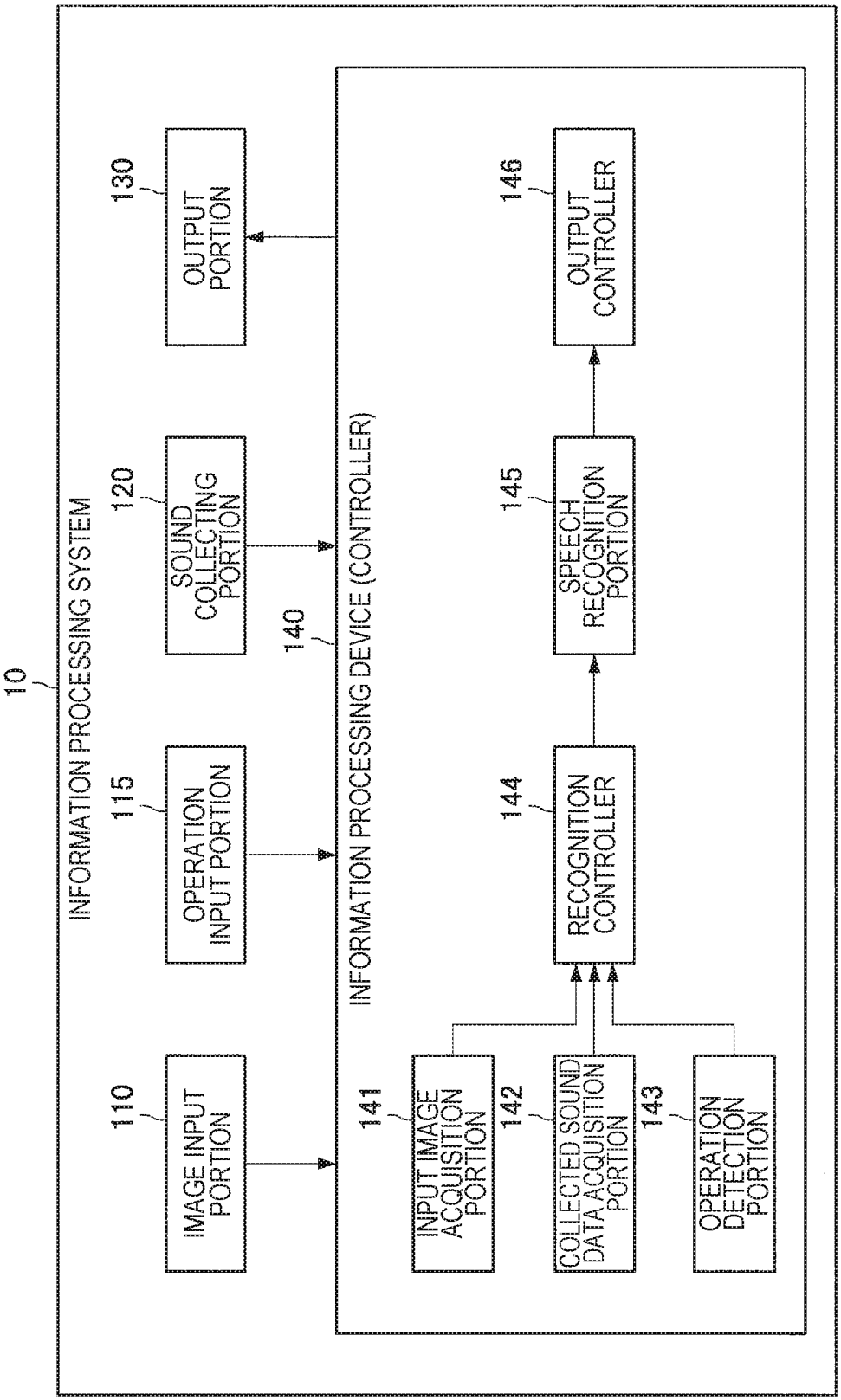
FIG. 2 is a block diagram illustrating a functional configuration example of the information processing system according to the embodiment.

Subsequently, a functional configuration example of the information processing system 10 according to an embodiment of the present disclosure is described. FIG. 2 is a block diagram illustrating a functional configuration example of the information processing system 10 according to an embodiment of the present disclosure. As illustrated in FIG. 2, the information processing system 10 according to an embodiment of the present disclosure is configured to include the image input portion 110, the operation input portion 115, the sound collecting portion 120, the output portion 130, and an information processing device 140 (hereinafter also referred to as "controller 140").

The information processing device 140 controls each component of the information processing system 10. In one example, the information processing device 140 generates information to be output from the output portion 130. In addition, in one example, the information processing device 140 incorporates the information, which is input by each of the image input portion 110, the operation input portion 115, and the sound collecting portion 120, in the information to be output from the output portion 130. As illustrated in FIG. 2, the information processing device 140 includes an input image acquisition portion 141, a collected sound data acquisition portion 142, an operation detection portion 143, a recognition controller 144, a speech recognition portion 145, and an output controller 146. These respective functional blocks will be described later in detail.

Moreover, the information processing device 140 may be composed of, for example, a central processing unit (CPU). In the case where the information processing device 140 is composed of a processing device such as CPU, this processing device can be composed of an electronic circuit.

The above description is given as to the functional configuration example of the information processing system 10 according to an embodiment of the present disclosure.

[1.3 Functional Details of Information Processing System]

Next, functional details of the information processing system 10 according to the embodiment of the present disclosure will be described. According to the embodiment of the present disclosure, the collected sound data acquisition portion 142 acquires collected sound data collected by the sound collecting portion 120, and the output controller 146 causes the output portion 130 to output at least whether or not a state of the collected sound data is suitable for speech recognition. Since the user can adjust utterance by recognizing whether or not the state of the collected sound data is suitable for the speech recognition with such a configuration, it is possible to improve accuracy of the speech recognition for the collected sound data.

As a state of the collected sound data that is suitable for the speech recognition, various states can be assumed. As an example, it is possible to state that the state of the collected sound data is suitable for the speech recognition when the amount of the collected sound data is within a predetermined allowable range. Thus, an example in which the output controller 146 causes the output portion 130 to output whether or not the amount of the collected sound data is within the predetermined allowable range as whether or not the state of the collected sound data is suitable for the speech recognition will be described.

Here, the amount of the collected sound data is not particularly limited. For example, the amount of the collected sound data may include a temporal length of the collected sound data. The amount of the collected sound data may include the number of phonemes extracted from the collected sound data. The amount of the collected sound data may include a temporal length of a sound-like part in the collected sound data. The amount of the collected sound data may be a unit of speech recognition (more specifically, the cumulative amount from the beginning to the termination of one or more collected sound data items as a target of collective speech recognition).

Figure 3:
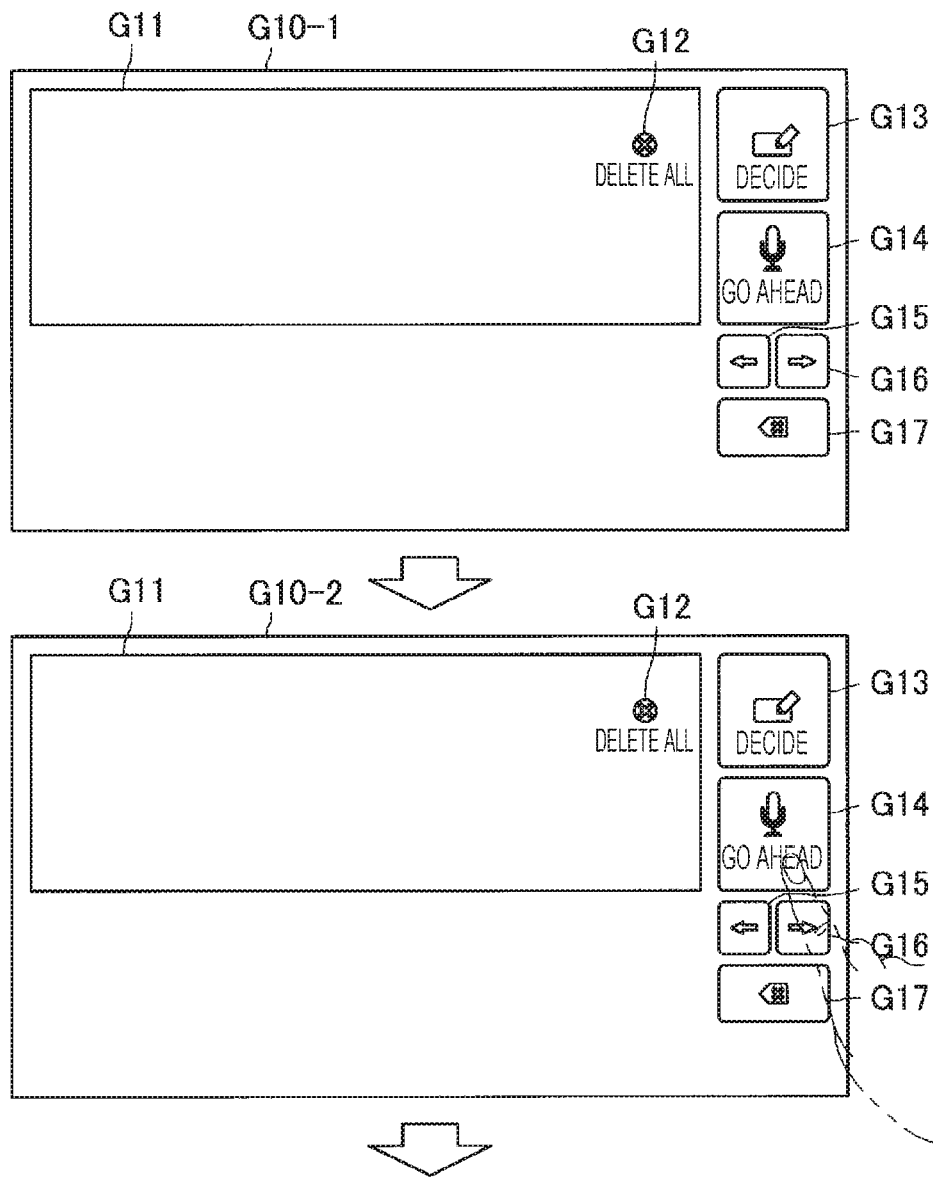
FIG. 3 is a diagram illustrating an example of transition of a screen displayed by an output portion 130 until termination of collected sound data that is a target of speech recognition is determined from display of an initial screen.

FIGS. 3 and 4 are diagrams illustrating an example of transition of a screen displayed by the output portion 130 until the termination of the collected sound data as a target of the speech recognition is determined from display of an initial screen. Referring to FIG. 3, the output controller 146 causes an initial screen G10-1 to be displayed. The initial screen G10-1 include a speech recognition start operation object G14 for starting the speech recognition and a recognized character string display section G11 as a display section of a character string acquired by the speech recognition (hereinafter, also referred to as a "recognized character string").

Also, the initial screen G10-1 include an all-deletion operation object G12 for deleting the entirety of the recognized character string and a decision operation object G13 for deciding the recognized character string. Also, the initial screen G10-1 includes a moving operation object G15 for moving a cursor position at the recognized character string backward, a moving operation object G16 for moving the cursor position at the recognized character string forward, and a deletion operation object G17 for deleting a character or a word at the cursor position.

First, the user performs an operation of selecting the speech recognition start operation object G14 as illustrated as the screen G10-2, and if the operation of selecting the speech recognition start operation object G14 is input through the operation input portion 115, then the operation is detected by the operation detection portion 143, and the output controller 146 causes the sound collection start screen G10-3 to be displayed. If the output controller 146 causes the sound collection start screen G10-3 to be displayed, the user starts to utter toward the sound collecting portion 120.

If the collected sound data collected by the sound collecting portion 120 is acquired by the collected sound data acquisition portion 142, the output controller 146 causes a predetermined object (hereinafter, also referred to as a "display object") Mu to be displayed as illustrated as a screen G10-4 during the sound collection. The display object Mu may remain stationary or may have movement as illustrated as the screen G10-4. When the display object Mu has movement, for example, a moving direction De of the display object Mu may depend on an arrival direction of voice of utterance by the user from a sound source to the sound collecting portion 120. A method of estimating the arrival direction of the voice of utterance by the user is also not particularly limited.

For example, the recognition controller 144 may estimate one arrival direction that coincides with or is similar to a direction of a finger of the user (a direction from the root to the tip of the finger, for example) who has performed the operation of selecting the speech recognition start operation object G14 as the arrival direction of the voice of utterance by the user. A range of similarity may be determined in advance. The direction of the finger may be acquired by analyzing an input image.

Alternatively, the recognition controller 144 may estimate an arrival direction of sound input by the sound collecting portion 120 as the arrival direction of the voice of utterance by the user. If there are a plurality of arrival directions of sound, an arrival direction of sound initially input from among the plurality of arrival directions may be estimated as the arrival direction of the voice of utterance by the user, or one arrival direction that coincides with or is similar to the direction of the finger of the user who has performed the operation of selecting the speech recognition start operation object G14 from among the plurality of arrival directions may be estimated as the arrival direction of the voice of utterance by the user.

Alternatively, the recognition controller 144 may estimate an arrival direction of sound with the largest volume input by the sound collecting portion 120 from among the plurality of arrival directions as the arrival direction of the voice of utterance by the user. In this manner, the arrival direction of the voice of utterance by the user can be estimated. In contrast, the recognition controller 144 may acquire, as noise, sound input by the sound collecting portion 120 from directions other than the arrival direction of the voice of utterance by the user.

FIG. 4 illustrates an example in which the output controller 146 moves the display objects Mu in the arrival direction (moving direction De) of the voice of utterance by the user. In this manner, the user can intuitively recognize that the voice of utterance by the user themselves is being collected by the sound collecting portion 120. However, the movement of the display objects Mu is not limited to such movement. FIG. 4 illustrates an example in which the destination of the display objects Mu is the speech recognition start operation object G14. However, the destination of the display objects Mu is not limited to such an example.

Although FIG. 4 illustrates the example in which the output controller 146 causes the circular display objects Mu that have appeared one after another to be moved in accordance with the sound collection performed by the sound collecting portion 120, the display state of the display objects Mu is not limited to such an example. For example, the output controller 146 may control various parameters of the display objects Mu on the basis of predetermined information (likeliness of speech of the collected sound data and volume, for example) in accordance with the collected sound data. The collected sound data used at this time may be collected sound data from the arrival direction of the voice of utterance by the user. The parameters of the display objects Mu may include at least any one of the shape, the transparency, the color, the size, and the motion of the display objects Mu.

A method of evaluating the likelihood of speech in the collected sound data is not particularly limited. For example, it is also possible to employ a method described in a patent literature (JP 2010-38943A) as the method of evaluating the likelihood of speech in the collected sound data. It is also possible to employ a method described in a patent literature (JP 2007-328228A) as the method of evaluating the likelihood of speech in the collected sound data. Although an example in which the evaluation of the likelihood of speech is performed by the output controller 146 will be described herein, the evaluation of the likelihood of speech may be performed by a server which is not illustrated in the drawing.

The recognition controller 144 causes the speech recognition portion 145 to start speech recognition for the collected sound data acquired by the collected sound data acquisition portion 142. Timing at which the speech recognition is started is not limited. For example, the recognition controller 144 may cause the speech recognition portion 145 to start the speech recognition for the collected sound data corresponding to the display objects Mu after the display objects Mu arrive the speech recognition start operation object G14. As illustrated as the screen G10-5 during recognition, the display objects Mu that have arrived the speech recognition start operation object G14 may be displayed such that the display objects Mu are gathering at the speech recognition start operation object G14.

The output controller 146 may causes the output portion 130 to output at least either of a lower limit or an upper limit of the allowable range. Since this allows the user to utter while recognizing at least either of the lower limit or the upper limit of the allowable range, it is possible to easily set the amount of the collected sound data within the allowable range and to improve accuracy of the speech recognition for the collected sound data.

Figure 5:
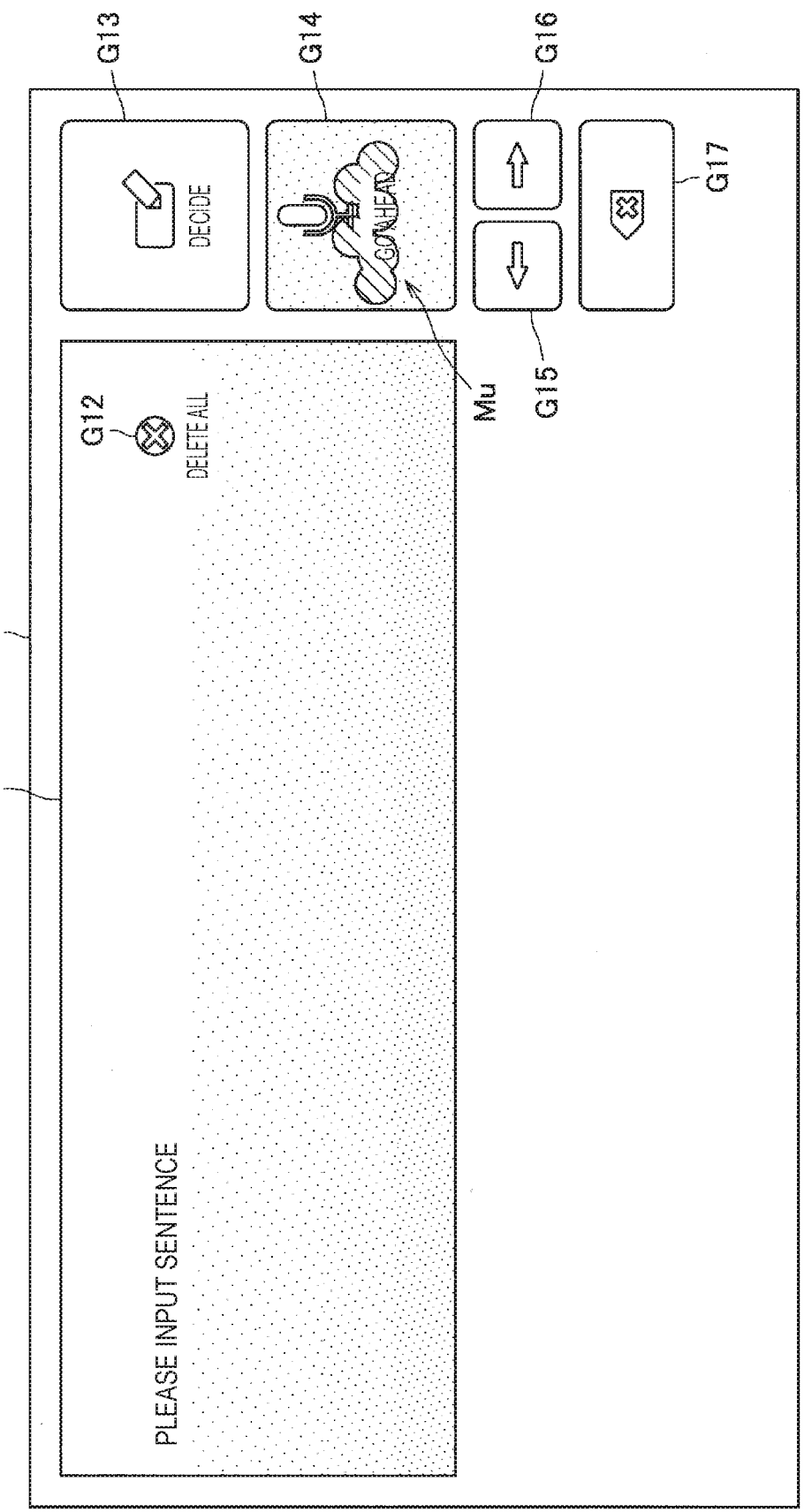
FIG. 5 is a diagram illustrating an example of display when the amount of the collected sound data is less than a lower limit of an allowable range.

Here, the output controller 146 may cause the output portion 130 to output indication of the state in which the collected sound data is not suitable for the speech recognition when the amount of the collected sound data is less than the lower limit of the allowable range in order to encourage the user to further utter. The indication of the state in which the collected sound data is not suitable for the speech recognition is not particularly limited. FIG. 5 is a diagram illustrating an example of display when the amount of the collected sound data is less than the lower limit of the allowable range.

As illustrated as a screen G10-6, the indication of the state in which the collected sound data is not suitable for the speech recognition may be represented by a predetermined color (pink, for example) applied to the recognized character string display section G11. Alternatively, as illustrated as the screen G10-6, the indication of the state in which the collected sound data is not suitable for the speech recognition may be represented by a predetermined color (pink, for example) applied to the speech recognition start operation object G14. Alternatively, as illustrated as the screen G10-6, the indication of the state in which the collected sound data is not suitable for the speech recognition may be represented by a predetermined color (gray, for example) applied to the display objects Mu.

The output controller 146 may cause the output portion 130 to output the amount of the collected sound data. In this manner, it is possible to expect that the user utters while recognizing the amount of the collected sound data, thereby to easily set the amount of the collected sound data in the allowable rage, and to improve accuracy of the speech recognition for the collected sound data. In the example illustrated in FIG. 5, the frame of the speech recognition start operation object G14 corresponds to the upper limit of the allowable range, and the size of the display objects Mu corresponds to the amount of the collected sound data.

Figure 6:
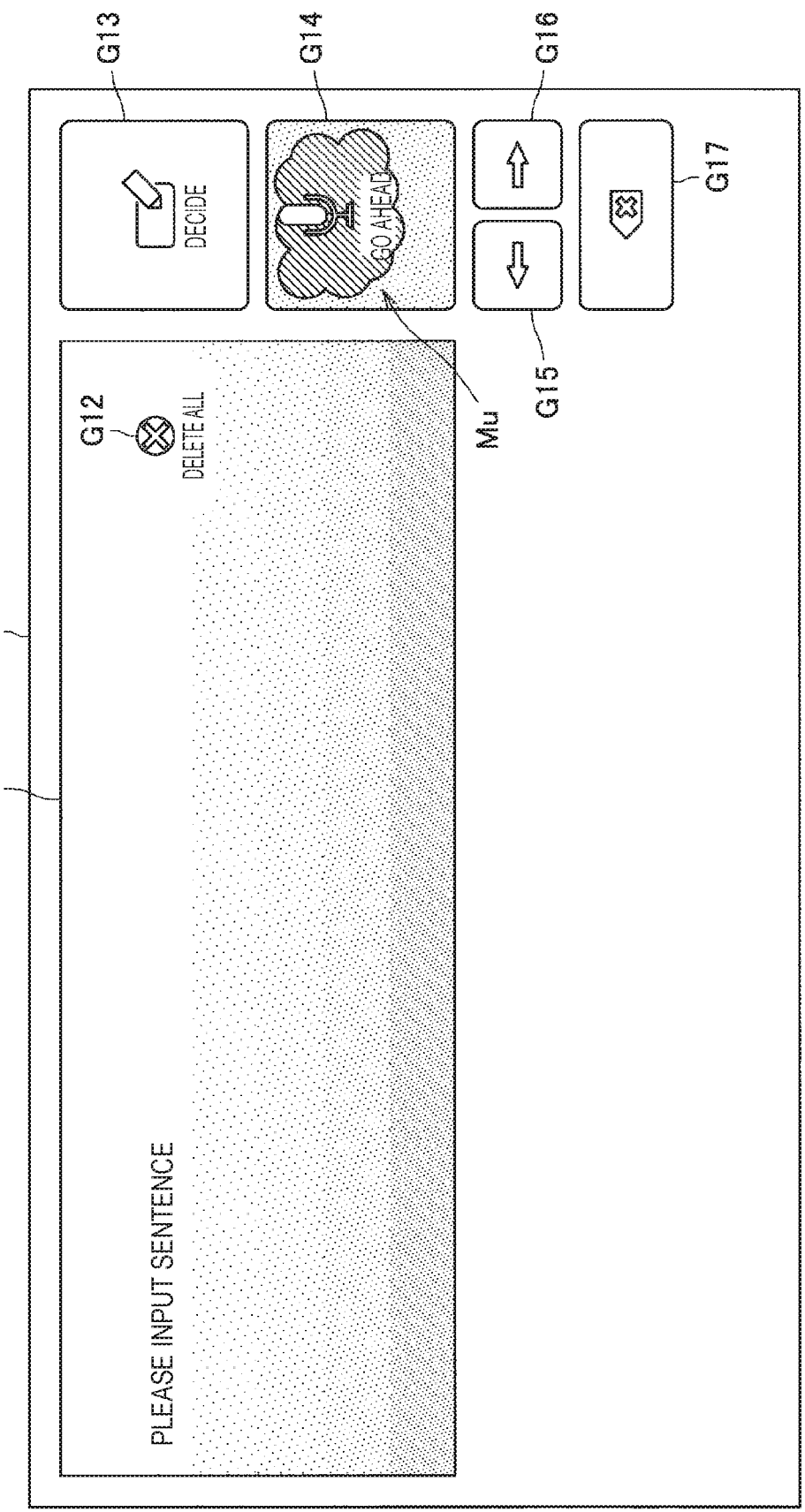
FIG. 6 is a diagram illustrating an example of display when the amount of the collected sound data is greater than the lower limit of the allowable range and the amount of the collected sound data is less than an upper limit of the allowable range.

The output controller 146 may cause the output portion 130 to output the indication that the amount of the utterance by the user is appropriate when the amount of the collected sound data is greater than the lower limit of the allowable range and the amount of the collected sound data is less than the upper limit of the allowable range. The indication of the state in which the collected sound data is suitable for the speech recognition is not particularly limited. FIG. 6 is a diagram illustrating an example of display when the amount of the collected sound data is greater than the lower limit of the allowable range and the amount of the collected sound data is less than the upper limit of the allowable range.

As illustrated as a screen G10-7, the indication of the state in which the collected sound data is suitable for the speech recognition may be represented by a predetermined color (a color that is darker than the aforementioned pink, for example) applied to the recognized character string display section G11. Alternatively, as illustrated as the screen G10-7, the indication of the state in which the collected sound data is suitable for the speech recognition may be represented by a predetermined color (a color that is darker than the aforementioned pink, for example) applied to the speech recognition start operation object G14. Alternatively, as illustrated as the screen G10-7, the indication of the state in which the collected sound data is suitable for the speech recognition may be represented as a predetermined color (a color that is darker than the aforementioned gray, for example) applied to the display objects Mu.

Figure 7:
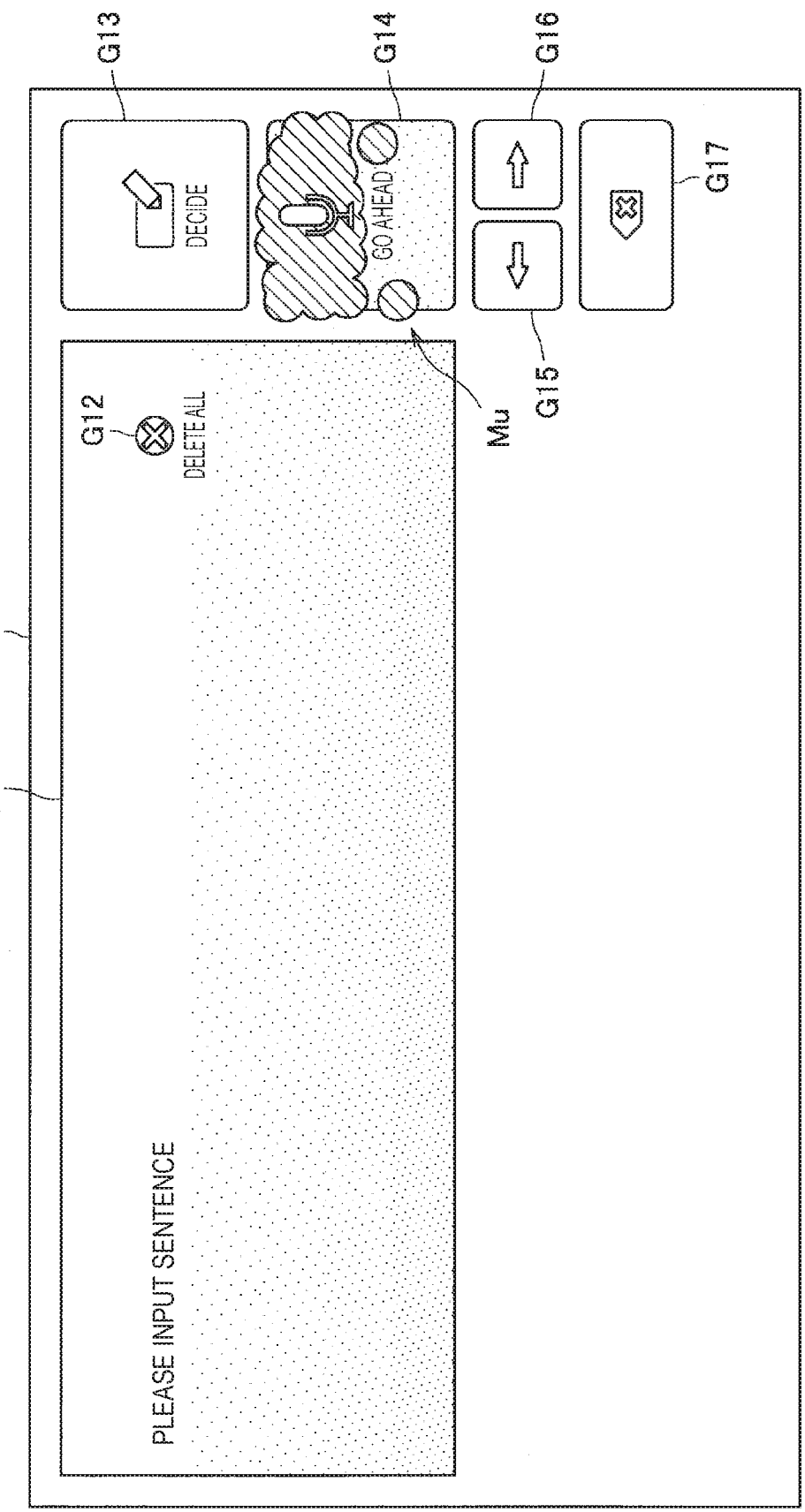
FIG. 7 is a diagram illustrating an example of display when the amount of the collected sound data is greater than the upper limit of the allowable range.

The output controller 146 may cause the output portion 130 to output the indication of the state in which the collected sound data is not suitable for the speech recognition when the amount of the collected sound data is greater than the upper limit of the allowable range in order to encourage the user to stop utterance. As described above, the indication of the state in which the collected sound data is not suitable for the speech recognition is not particularly limited. FIG. 7 is a diagram illustrating an example of display when the amount of the collected sound data is greater than the upper limit of the allowable range.

As illustrated as a screen G10-8, the indication of the state in which the collected sound data is not suitable for the speech recognition may be represented by a predetermined color (pink, for example) applied to the recognized character string display section G11. Alternatively, as illustrated as the screen G10-8, the indication of the state in which the collected sound data is not suitable for the speech recognition may be represented by a predetermined color (pink, for example) applied to the speech recognition start operation object G14. Alternatively, as illustrated as the screen G10-8, the indication of the state in which the collected sound data is not suitable for the speech recognition may be represented by a predetermined color (gray, for example) applied to the display objects Mu.

As illustrated as the screen G10-8, the output controller 146 may apply animation expressing overflow from the speech recognition start operation object G14 to the display objects Mu when the amount of the collected sound data is greater than the upper limit of the allowable range. The output controller 146 may apply animation expressing switching between a plurality of colors (between gray and black, for example) to the display objects Mu when the amount of the collected sound data is greater than the upper limit of the allowable range.

Here, termination of the part that is a target of the speech recognition may be determined in any way. For example, the recognition controller 144 may detect whether or not there is a part with a volume that is less than a predetermined volume for a period of time exceeding a threshold value (hereinafter, also simply referred to as a "silent part") in the collected sound data, and may determine the termination of the part as the target of the speech recognition on the basis of timing at which the silent part is detected. FIG. 8 is a diagram illustrating an example of display when the silent part is detected.

As illustrated as a screen G10-9, the timing at which the silent part is detected may be determined as the termination of the part as the target of the speech recognition. A screen G10-10 is a screen after the termination of the part as the target of the speech recognition is determined. Referring to the screen G10-10, the display objects Mu have increased, and a message displayed on the speech recognition start operation object G14 has been changed from "Go ahead" to "Please wait". Subsequently, the speech recognition portion 145 causes the speech recognition portion 145 to perform the speech recognition for a part or the entirety of the collected sound data. Specifically, the recognition controller 144 causes the speech recognition portion 145 to perform the speech recognition for the collected sound data except for the silent part.

The speech recognition portion 145 performs the speech recognition for the collected sound data except for the silent part. For example, the speech recognition portion 145 may acquire a recognized character string by performing the speech recognition for the collected sound data from the arrival direction of the voice of utterance by the user. In this manner, it is possible to perform the speech recognition on speech with less noise as compared with a case where the speech recognition is performed directly on speech input by the sound collecting portion 120, and to thereby expect an improvement in accuracy of the speech recognition. The following operation differs depending on whether or not the speech recognition has been successfully performed.

FIG. 9 is a diagram illustrating an example of display when the speech recognition has been successfully performed. As illustrated as a screen G10-11, the output controller 146 may move the display objects Mu to the side of the recognized character string display section G11 if the speech recognition portion 145 has successfully performed the speech recognition. This enables the user to predict that the character string will be displayed on the recognized character string display section G11. As illustrated as a screen G10-12, the output controller 146 may further move the display objects Mu to the side of the recognized character string display section G11.

Referring to the screen G10-12, the output controller 146 causes the recognized character string "I drove your car to airports" to be displayed in the recognized character string display section G11. In addition, the output controller 146 causes a selection candidate display section G18, a selection candidate switching operation object G19, and the like to be displayed. Although selection candidates displayed in the selection candidate display section G18 are not particularly limited, a predictive conversion category, a phrase category, and an original form category, and the like are displayed as selection candidates in the example illustrated as the screen G10-12.

FIG. 10 is a diagram illustrating an example of display when the speech recognition is failed. If the speech recognition by the speech recognition portion 145 is failed, the output controller 146 may move the display objects Mu to the side where the recognized character string display section G11 is not present (to the lower side, for example) as illustrated as a screen G10-13. This enables the user to predict that the speech recognition has been failed. As illustrated as a screen G10-4, the output controller 146 may further move the display objects Mu to the side where the recognized character string display section G11 is not present (to the lower side, for example).

Figure 11:
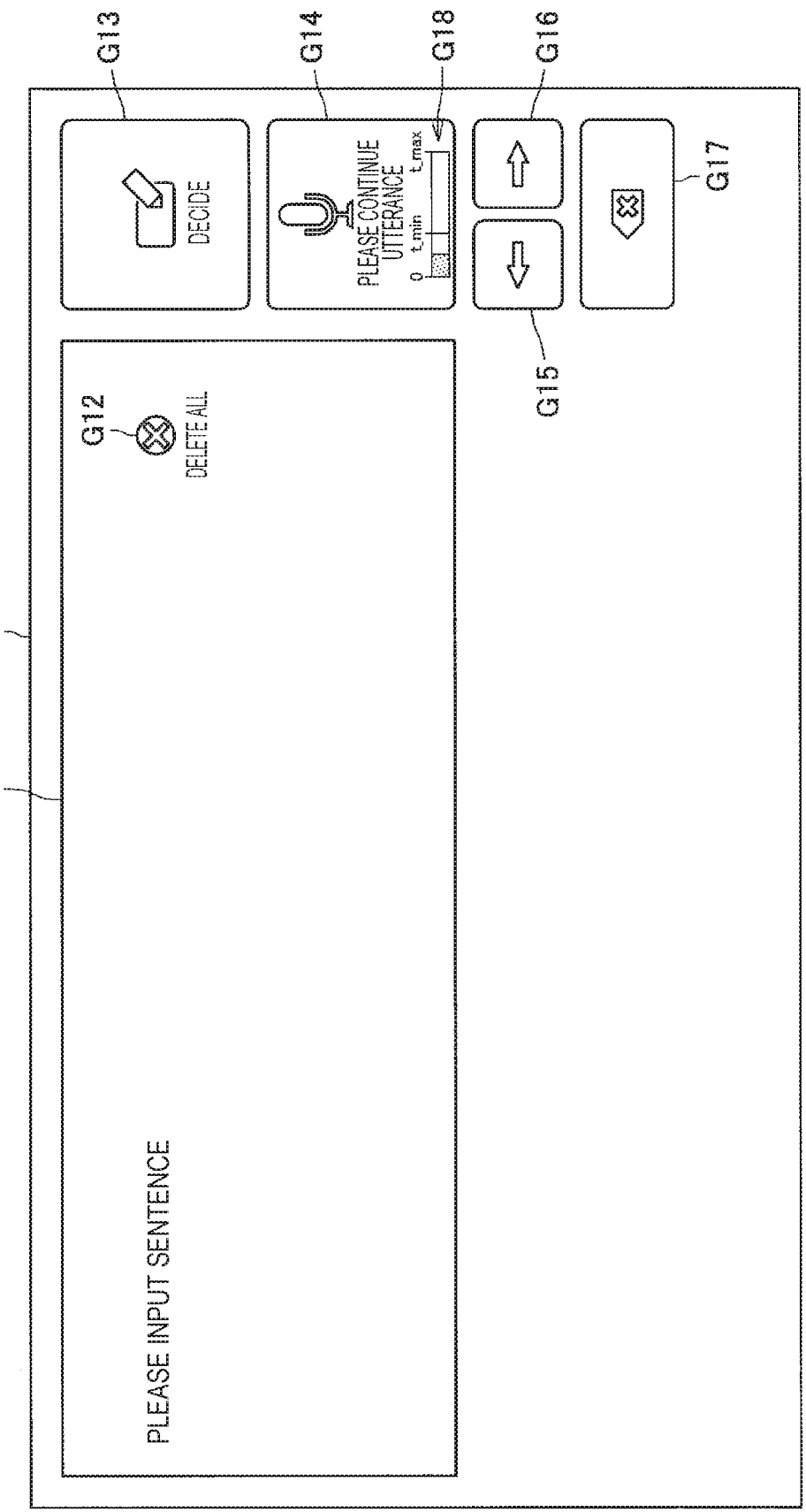
FIG. 11 is a diagram illustrating another example of display when the amount of the collected sound data is less than the lower limit of the allowable range.

In the description of the example illustrated in FIG. 5, the frame of the speech recognition start operation object G14 corresponds to the upper limit of the allowable range, and the size of the display objects Mu corresponds to the amount of the collected sound data. However, the allowable range and the amount of the collected sound data may be expressed in any way. FIG. 11 is a diagram illustrating another example of display when the amount of the collected sound data is less than the lower limit of the allowable range. As illustrated as a screen G10-15, the output controller 146 may cause an indicator G18 indicating the amount of the collected sound data to be displayed. As illustrated as the screen G10-15, the indicator G18 may include the lower limit (t_min) of the allowable range and the upper limit (t_max) of the allowable range.

As described above, the output controller 146 may cause the output portion 130 to output the indication of the state in which the collected sound data is not suitable for the speech recognition when the amount of the collected sound data is less than the lower limit of the allowable range in order to encourage the user to further utter. The indication of the state in which the collected sound data is not suitable for the speech recognition may be represented by a message for encouraging the user to utter. As illustrated in FIG. 11, the message for encouraging the user to utter may be a message such as "Please continue utterance".

Figure 12:
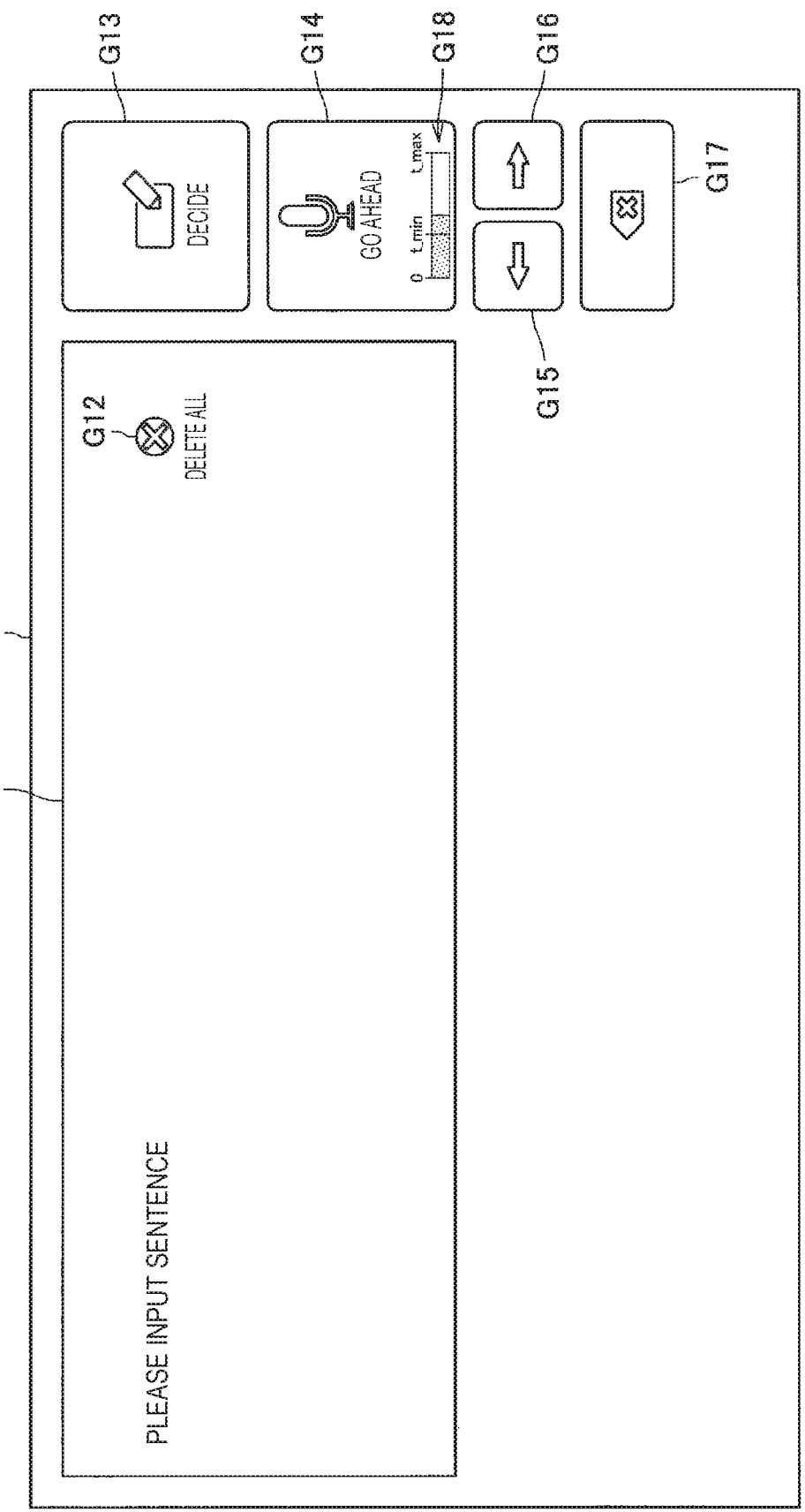
FIG. 12 is a diagram illustrating another example of display when the amount of the collected sound data is greater than the lower limit of the allowable range and the amount of the collected sound data is less than the upper limit of the allowable range.

FIG. 12 is a diagram illustrating another example of display when the amount of the collected sound data is greater than the lower limit of the allowable range and the amount of the collected sound data is less than the upper limit of the allowable range. As described above, the output controller 146 may cause the output portion 130 to output the indication of the state in which the collected sound data is suitable for the speech recognition when the amount of the collected sound data is greater than the lower limit of the allowable range and the amount of the collected sound data is less than the upper limit of the allowable range. The indication of the state in which the collected sound data is suitable for the speech recognition may be represented by a message such as "Go ahead" as illustrated in FIG. 12.

Figure 13:
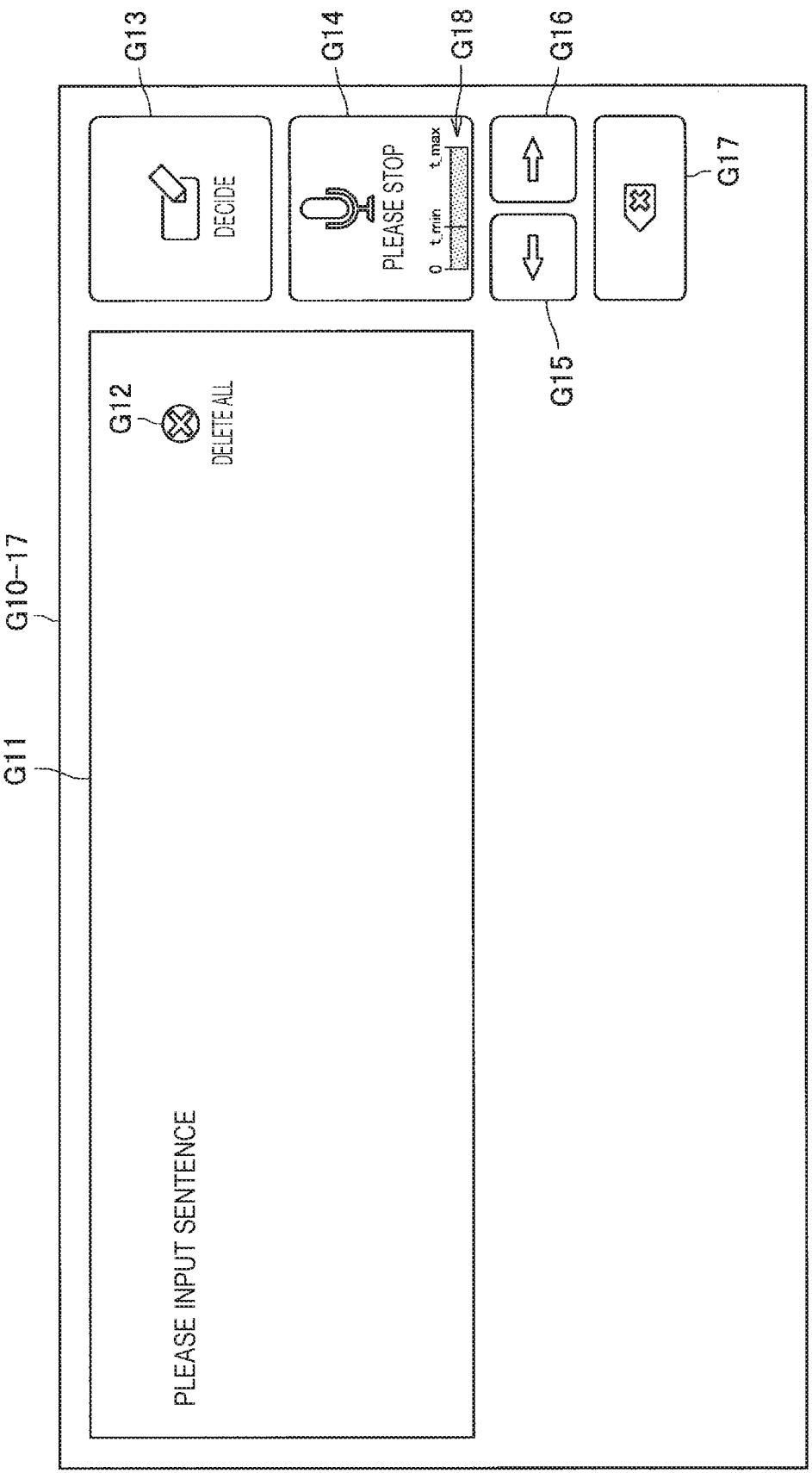
FIG. 13 is a diagram illustrating another example of display when the amount of the collected sound data is greater than the upper limit of the allowable range.

FIG. 13 is a diagram illustrating another example of display when the amount of collected sound data is greater than the upper limit of the allowable range. As described above, the output controller 146 may cause the output portion 130 to output the indication of the state in which the collected sound data is not suitable for the speech recognition when the amount of the collected sound data is greater than the upper limit of the allowable range in order to encourage the user to stop utterance. The indication of the state in which the collected sound data is not suitable for the speech recognition may be represented by a message for encouraging the user to utter. As illustrated in FIG. 13, the message for encouraging the user to utter may be a message such as "Please stop".

The functional details of the information processing system 10 according to the embodiment of the present disclosure were described hitherto.

Figure 14:
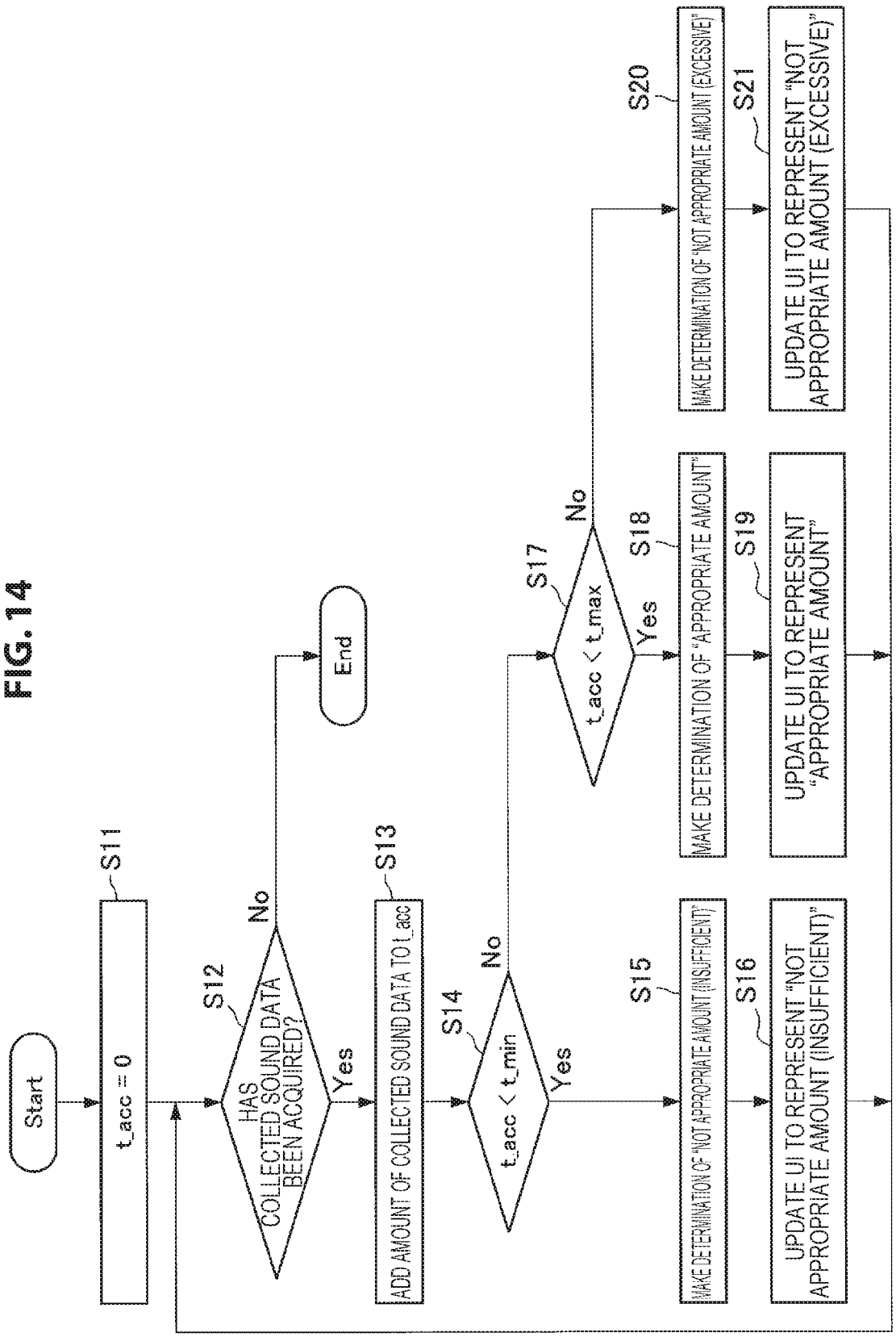
FIG. 14 is a flowchart illustrating an example of an overall flow of operations performed by the information processing system according to the embodiment of the present disclosure.

Subsequently, an overall flow of operations of the information processing system 10 according to the embodiment of the present disclosure will be described. FIG. 14 is a flowchart illustrating an example of an overall flow of operations of the information processing system 10 according to the embodiment of the present disclosure. The flowchart of FIG. 14 illustrates only an example of the overall flow of the operations of the information processing system 10 according to the embodiment of the present disclosure, the entire flow of the operations of the information processing system 10 according to the embodiment of the present disclosure is not limited to the example illustrated in the flowchart in FIG. 14.

First, the output controller 146 sets zero as a variable t_acc (S11). The output controller 146 completes the operation when no collected sound data has been acquired ("No" in S12) or adds the amount of the collected sound data acquired to the variable t_acc (S13) when the collected sound data has been acquired ("Yes" in S12). The output controller 146 determines that a unit as a target of the speech recognition is not an appropriate amount (insufficient) (S15) when the variable t_acc is less than the lower limit (t_min) of the allowable range ("Yes" in S14), updates a UI (screen) so as to represent that the unit as the target of the speech recognition is not an appropriate amount (insufficient) (S16), and moves on to the operation in S12.

The output controller 146 moves on to the operation in S17 when the variable t_acc is greater than the lower limit (t_min) of the allowable range ("No" in S14). Then, the output controller 146 determines that the unit as the target of the speech recognition is an appropriate amount (S18) when the variable t_acc is less than the upper limit (t_max) of the allowable range ("Yes" in S17), updates the UI (screen) so as to represent that the unit as the target of the speech recognition is an appropriate amount (S19), and moves on to the operation in S12.

Furthermore, the output controller 146 determines that the unit as the target of the speech recognition is not an appropriate amount (excessive) (S20) when the variable t_acc is less than the upper limit (t_max) of the allowable range ("No" in S17), updates the UI (screen) so as to represent that the unit as the target of the speech recognition is not an appropriate amount (excessive) (S21), and moves on to the operation in S12.

The overall flow of the operation of the information processing system 10 was described hitherto. Although the aforementioned lower limit and the upper limit of the allowable range may be always constant here, at least either of the lower limit or the upper limit of the allowable range may be updated by the output controller 146. For example, the output controller 146 may update at least either of the lower limit or the upper limit of the allowable range on the basis of the amount of noise. For example, it is considered that the accuracy of the speech recognition deteriorates as the amount of noise increases. Thus, the output controller 146 may update the upper limit of the allowable range such that the upper limit of the allowable range increases as the amount of noise increases.

Figure 15:
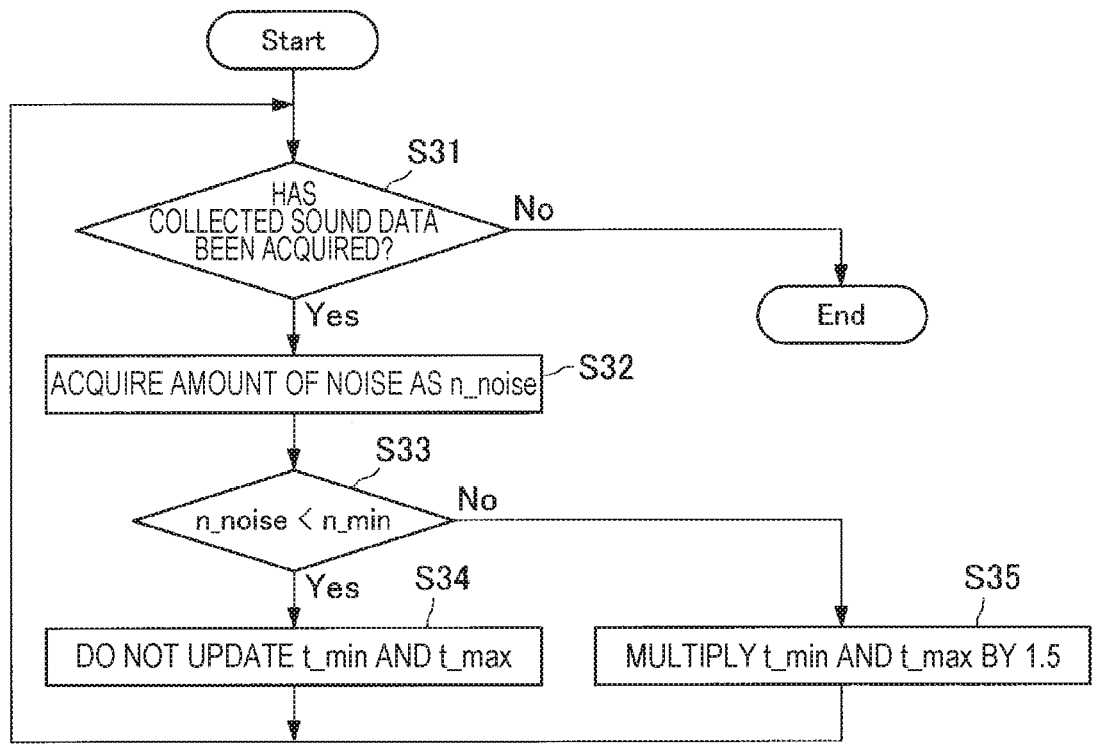
FIG. 15 is a flowchart illustrating an example of a flow of an operation of updating the lower limit and the upper limit of the allowable range in accordance with the amount of noise.

FIG. 15 is a flowchart illustrating an example of a flow of an operation of updating the lower limit and the upper limit of the allowable range in accordance with the amount of noise. The flowchart of FIG. 15 illustrates only an example of a flow of an operation of updating the lower limit and the upper limit of the allowable range in accordance with the amount of noise, the flow of the operation of updating the lower limit and the upper limit of the allowable range in accordance with the amount of noise is not limited to the example illustrated in the flowchart of FIG. 15.

First, the output controller 146 determines whether or not collected sound data has been acquired (S31), and completes the operation when no collected sound data has been acquired ("No" in S31) or acquires the amount of noise as a variable n_noise (S32) when the collected sound data has been acquired ("Yes" in S31). Subsequently, the output controller 146 moves on to the operation in S31 without updating the lower limit (t_min) of the allowable range and the upper limit (t_max) of the allowable range (S34) when the variable n_noise is less than a predetermined noise lower limit amount n_min ("Yes" in S33).

In contrast, the output controller 146 multiples the lower limit (t_min) of the allowable range and the upper limit (t_max) of the allowable range by 1.5 (S35) and moves on to the operation in S31 when the variable n_noise is greater than the predetermined noise lower limit amount n_min ("No" in S33). The value of 1.5 is only an example of a value by which the lower limit (t_min) of the allowable range and the upper limit (t_max) of the allowable range are multiplied, and another value that is greater than 1 may be used instead of the value of 1.5.

The example of the flow of the operation of updating the lower limit and the upper limit of the allowable range in accordance with the amount of noise was described hitherto. Although the threshold value for detecting the silent part was described in the aforementioned example, the threshold value for detecting the silent part may be constant or updated. When the collected sound data includes a predetermined expression indicating a beginning of a sentence or an end of a sentence, for example, it is considered that the sentence uttered by the user has reached a stopping point, and it is therefore preferable to change a condition for completing the part as the target of the speech recognition.

Therefore, the output controller 146 preferably updates the threshold value when the collected sound data includes the predetermined expression indicating a beginning of a sentence or an end of a sentence. More specifically, when the collected sound data includes the predetermined expression indicating a beginning of a sentence or an end of a sentence, it is considered that the sentence uttered by the user has reached a stopping point, and it is therefore preferable to loosen the condition for completing the part as the target of the speech recognition. Therefore, the output controller 146 preferably sets a smaller threshold value when the collected sound data includes the predetermined expression indicating a beginning of a sentence or an end of a sentence.

The expression indicating a beginning of a sentence or an end of a sentence (hereinafter, also referred to as a "start word") may be registered in advance in a start word registration database (DB) as data associated with speech information. Then, the output controller 146 may determine whether or not a start word is included in the collected sound data depending on whether or not speech information registered in the start word registration DB is included in the collected sound data. Although an example in which a flow for determining whether or not a start word is included in the collected sound data (hereinafter, also referred to as a "start word recognition processing flow") is performed by the output controller 146 will be described herein, the start word recognition processing flow may be performed by a server which is not illustrated in the drawing.

Here, the start word registration DB will be described. FIG. 16 is a diagram illustrating configuration examples of various DBs. The start word registration DB illustrated in FIG. 16 is a DB that stores data in such a manner that start words and speech information thereof are associated. The sentence punctuation determination word DB illustrated in FIG. 16 is a DB that stores data in such a manner that expressions indicating beginnings of sentences or ends of sentences and speech information thereof are associated.

The permission word DB is a DB for permitting cases where words similar to sentence punctuation determination words are uttered as well. The permission word DB is a DB that stores data in such a manner that permission words and speech information thereof are associated. Although the start word registration DB may be generated in any way, the start word registration DB may be generated by registering the words, which are registered in the sentence punctuation determination word DB, in the start word registration DB. Additionally, the start word registration DB may be formed by registering the words, which are registered in the permission word DB, in the start word registration DB.

Figure 17:
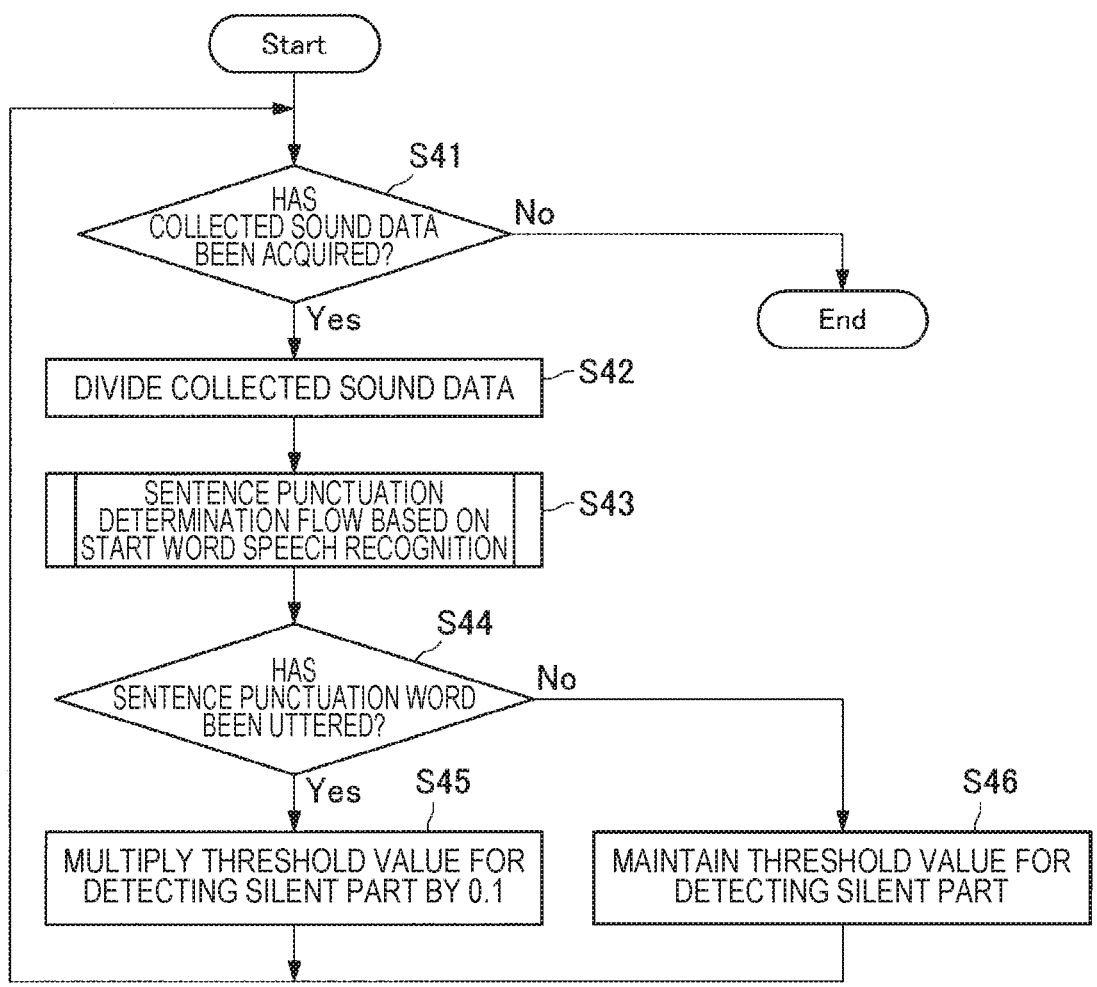
FIG. 17 is a flowchart illustrating an example of a flow of an operation of updating a threshold value for detecting a silent part.

The start word registration DB was described hitherto. Next, a flow of an operation of updating the threshold value for detecting a silent part will be described. FIG. 17 is a flowchart illustrating an example of a flow of an operation of updating the threshold value for detecting a silent part. The flowchart of FIG. 17 illustrates only an example of the operation of updating the threshold value for detecting a silent part, the flow of the operation of updating the threshold value for detecting a silent part is not limited to the example illustrated in the flowchart of FIG. 17.

First, the output controller 146 determines whether or not collected sound data has been acquired (S41), and completes the operation when no collected sound data has been acquired ("No" in S41) or divides the collected sound data (S42) and execute a sentence punctuation determination flow based on start word speech recognition (S43) when collected sound data has been acquired ("Yes" in S41). Details of the sentence punctuation determination flow based on the start word speech recognition will be described later with reference to FIG. 18.

Subsequently, the output controller 146 multiplies the threshold value for detecting a silent part by 0.1 (S45) and moves on to the operation in S41 when it is determined that a sentence punctuation word has been uttered ("Yes" in S44). Since the value of 0.1 is only an example of the value by which the threshold value for detecting a silent part is multiplied, another value that is less than 1 may be used instead of the value of 0.1. In contrast, the output controller 146 maintains the threshold value for detecting a silent part (S46) and moves on to the operation in S41 when it is determined that no sentence punctuation word has been uttered ("No" in S44).

Figure 18:
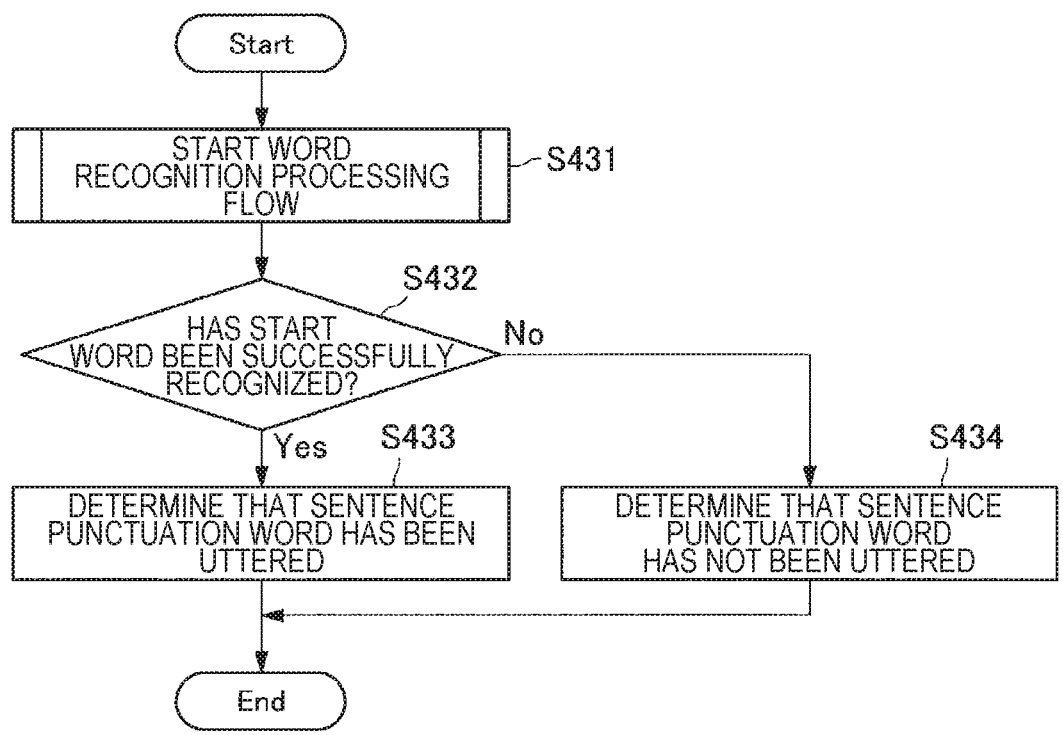
FIG. 18 is a flowchart illustrating details of a sentence punctuation determination flow by start word speech recognition.

The example of the flow of the operation of updating the threshold value for detecting a silent part was described hitherto. Next, details of the sentence punctuation determination flow based on the start word speech recognition illustrated in FIG. 17 will be described. FIG. 18 is a flowchart illustrating details of the sentence punctuation determination flow based on the start word speech recognition. The flowchart of FIG. 18 illustrates only an example of the sentence punctuation determination flow based on the start word speech recognition, the sentence punctuation determination flow based on the start word speech recognition is not limited to the example illustrated in the flowchart of FIG. 18.

First, the output controller 146 executes the aforementioned start word recognition processing flow (S431) and determines whether or not a start word has successfully been recognized (S432). The output controller 146 determines that a sentence punctuation word has been uttered (S433) and completes the operation when the start word has successfully been recognized ("Yes" in S432). In contrast, the output controller 146 determines that no sentence punctuation word has been uttered (S434) and completes the operation when the recognition of a start word has been failed ("No" in S432).

The details of the sentence punctuation determination flow based on the start word speech recognition were described hitherto. In the above description, the example in which the start word recognition processing flow S431 was utilized as an example of a method of determining whether or not a sentence punctuation word has been uttered was described. However, the method of determining whether or not a sentence punctuation word has been uttered is not limited to such an example. For example, the output controller 146 may determine whether or not a sentence punctuation word has been uttered on the basis of an intermediate result of the speech recognition when the intermediate result of the speech recognition by the speech recognition portion 145 is obtained (the output controller 146 may determine whether or not a start word is included in the collected sound data depending on whether or not the start word is included in the intermediate result of the speech recognition).

Figure 19:
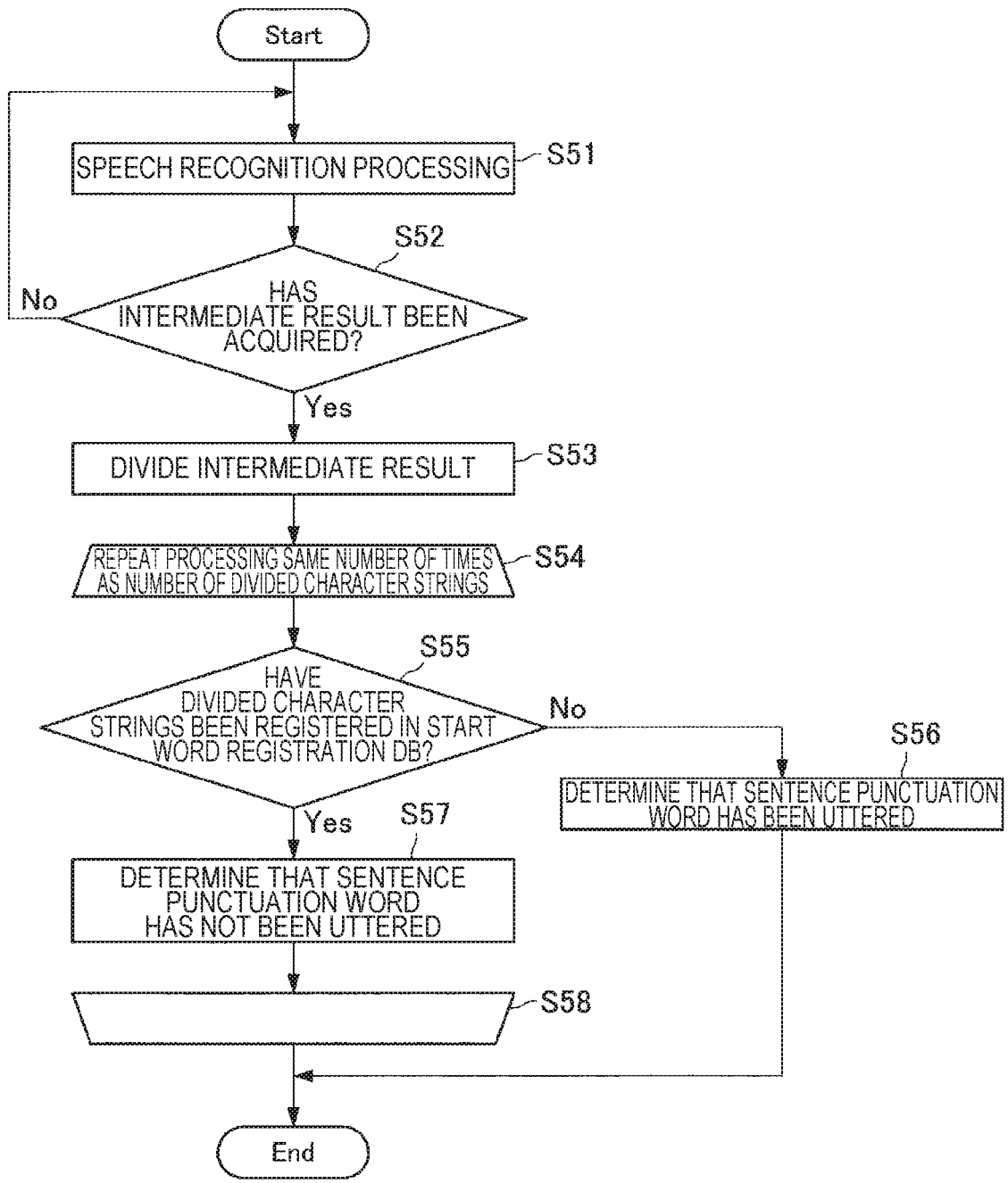
FIG. 19 is a flowchart illustrating an example of a flow of an operation of determining whether or not a sentence punctuation word is uttered on the basis of an intermediate result of the speech recognition.

FIG. 19 is a flowchart illustrating an example of a flow of an operation of determining whether or not a sentence punctuation word has been uttered on the basis of the intermediate result of the speech recognition. The flowchart of FIG. 19 illustrates only an example of the operation of determining whether or not a sentence punctuation word has been uttered on the basis of the intermediate result of the speech recognition, the flow of the operation of determining whether or not the sentence punctuation word has been uttered on the basis of the intermediate result of the speech recognition is not limited to the example illustrated in the flowchart of FIG. 19.

First, the speech recognition portion 145 performs speech recognition processing for the collected sound data (S51). Subsequently, the output controller 146 moves on to the operation in S51 when no intermediate result of the speech recognition has been acquired ("No" in S52) or divides the intermediate result (S53) when the intermediate result of the speech recognition has been acquired ("Yes" in S52). For dividing the intermediate result, processing of dividing the intermediate result into morphemes by using morphological analysis may be used. Subsequently, the output controller 146 repeats the processing (S54 to S58) the same number of times as the number of character strings obtained by the division (divided character strings).

The output controller 146 determines whether or not the divided character strings have been registered in the start word registration DB (S55), determines that no sentence punctuation word has been uttered (S57), and returns to the start of the repetition of the processing (S54) when it is determined that the divided character strings have been registered in the start word registration DB ("Yes" in S55) during the repetition of the processing (S54 to S58). In contrast, the output controller 146 determines that a sentence punctuation word has been uttered (S56) and leaves the repetition of the processing (S54 to S58) when it is determined that the divided character strings have not been registered in the start word registration DB ("No" in S55). The operation of determining whether or not a sentence punctuation word has been uttered on the basis of the intermediate result of the speech recognition was described hitherto.

[1.4 Modification Example of Aptitude Determination for Speech Recognition]

The example in which whether the state of the collected sound data was suitable for the speech recognition was determined depending on whether the amount of the collected sound data was within the predetermined allowable range was described hitherto. However, whether or not the state of the collected sound data is suitable for the speech recognition may be determined by another method. For example, it is assumed that if a plurality of sentences are present in collected sound data, accuracy of speech recognition for the collected sound data is not improved. Thus, the output controller 146 may determine whether or not the state of the collected sound data is suitable for the speech recognition depending on whether or not a start word is included in the collected sound data.

Figure 20:
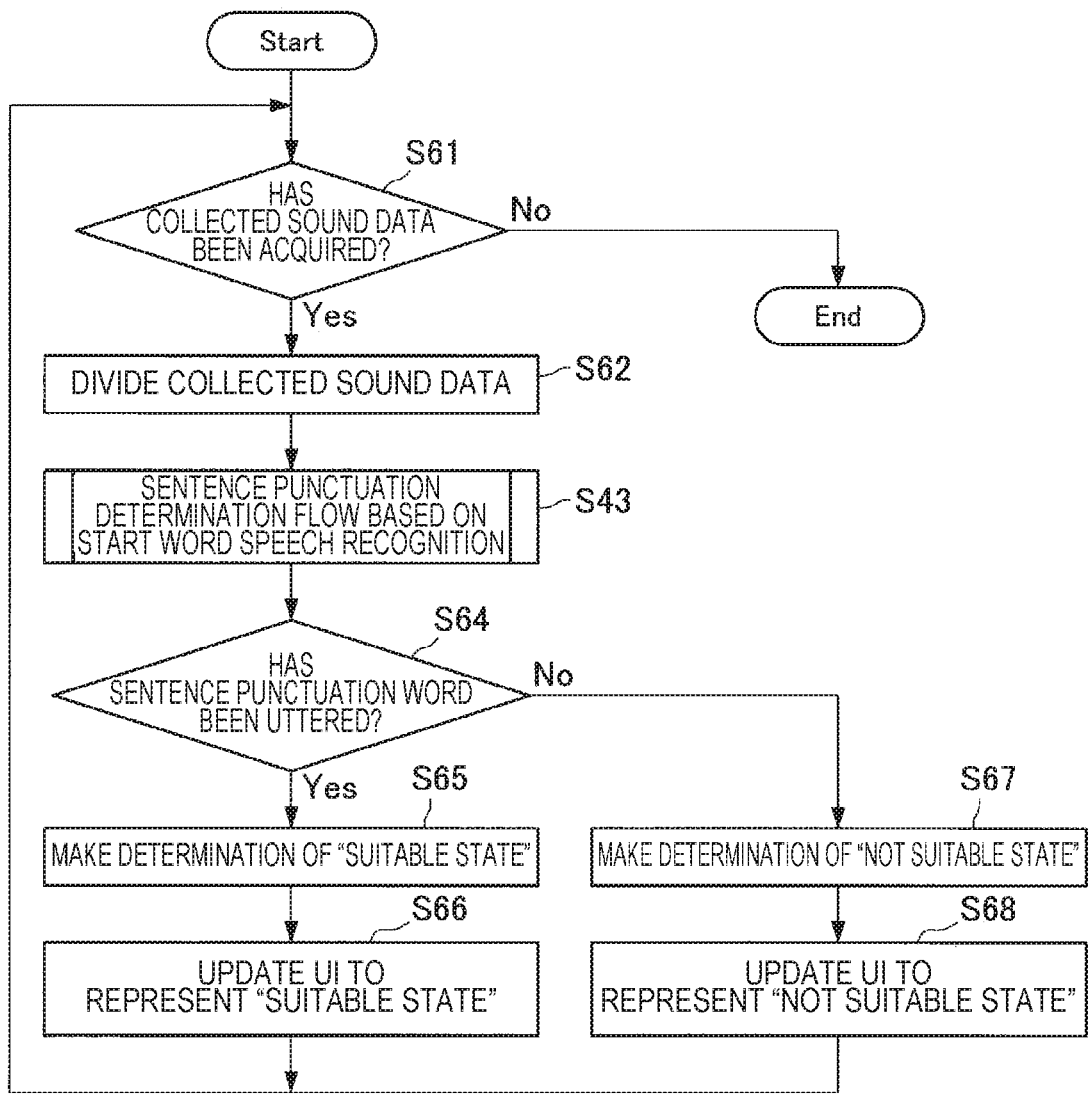
FIG. 20 illustrates a flow of an operation according to a modification example of aptitude determination for the speech recognition.

That is, the output controller 146 may cause the output portion 130 to output whether or not a start word is included in the collected sound data as whether or not the state of the collected sound data is suitable for the speech recognition. Hereinafter, a modification example of the aptitude determination for such speech recognition will be described. FIG. 20 illustrates a flow of operations according to the modification example of the aptitude determination for the speech recognition. FIG. 20 is a flowchart illustrating an example of the flow of the operations according to the modification example of the aptitude determination for the speech recognition. The flowchart of FIG. 20 illustrates only an example of the operations according to the modification example of the aptitude determination for the speech recognition, and the flow of the operations according to the modification example of the aptitude determination for the speech recognition is not limited to the example illustrated in the flowchart of FIG. 20.

First, the output controller 146 determines whether or not collected sound data has been acquired (S61), and completes the operation when no collected sound data has been acquired ("No" in S61), or divides the collected sound data (S62) and executes the sentence punctuation determination flow based on the start word speech recognition (S43) when the collected sound data has been acquired ("Yes" in S61). The sentence punctuation determination flow based on the start word speech recognition can be executed as already described.

Subsequently, the output controller 146 determines that the state of the collected sound data is suitable for the speech recognition (S65), updates the UI (screen) so as to represent that the state of the collected sound data is suitable for the speech recognition (S66), and moves on to the operation in S61 when it is determined that a sentence punctuation word has been uttered ("Yes" in S64). In contrast, the output controller 146 determines that the state of the collected sound data is not suitable for the speech recognition (S67), updates the UI (screen) so as to represent that the state of the collected sound data is not suitable for the speech recognition (S68), and moves on to the operation in S61 when it is determined that no sentence punctuation word has been uttered ("No" in S64).

The modification example of the aptitude determination for the speech recognition was described hitherto.

[1.5. Modified Example of Display Form]

Figure 21:
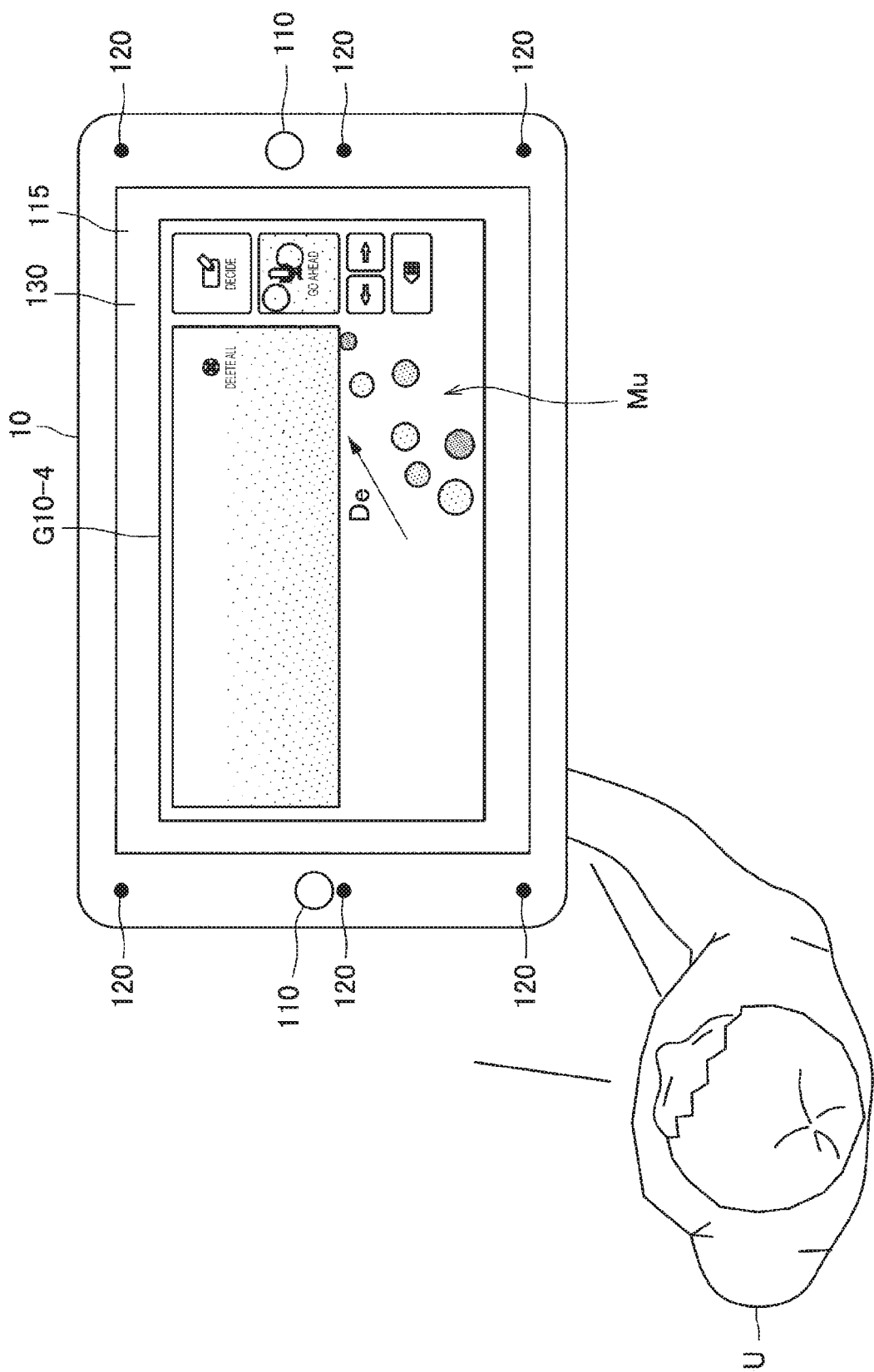
FIG. 21 is a diagram illustrating a modification example of a display form of an output portion.

The above description is given as to the example in which the output portion 130 is a projector capable of projecting a screen onto the top surface of the table Tbl. However, the display form of the output portion 130 is not limited to this example. Hereinafter, a modification example of the display form of the output portion 130 will be described. FIG. 21 is a diagram illustrating a modified example of the display form of the output portion 130. As illustrated in FIG. 21, in the case where the information processing system 10 is a mobile terminal, the output portion 130 may be provided in the mobile terminal. The type of the mobile terminal is not limited to a particular type, and it may be a tablet terminal, a smartphone, or a cellular phone.

[1.6. Hardware Configuration Example]

Figure 22:
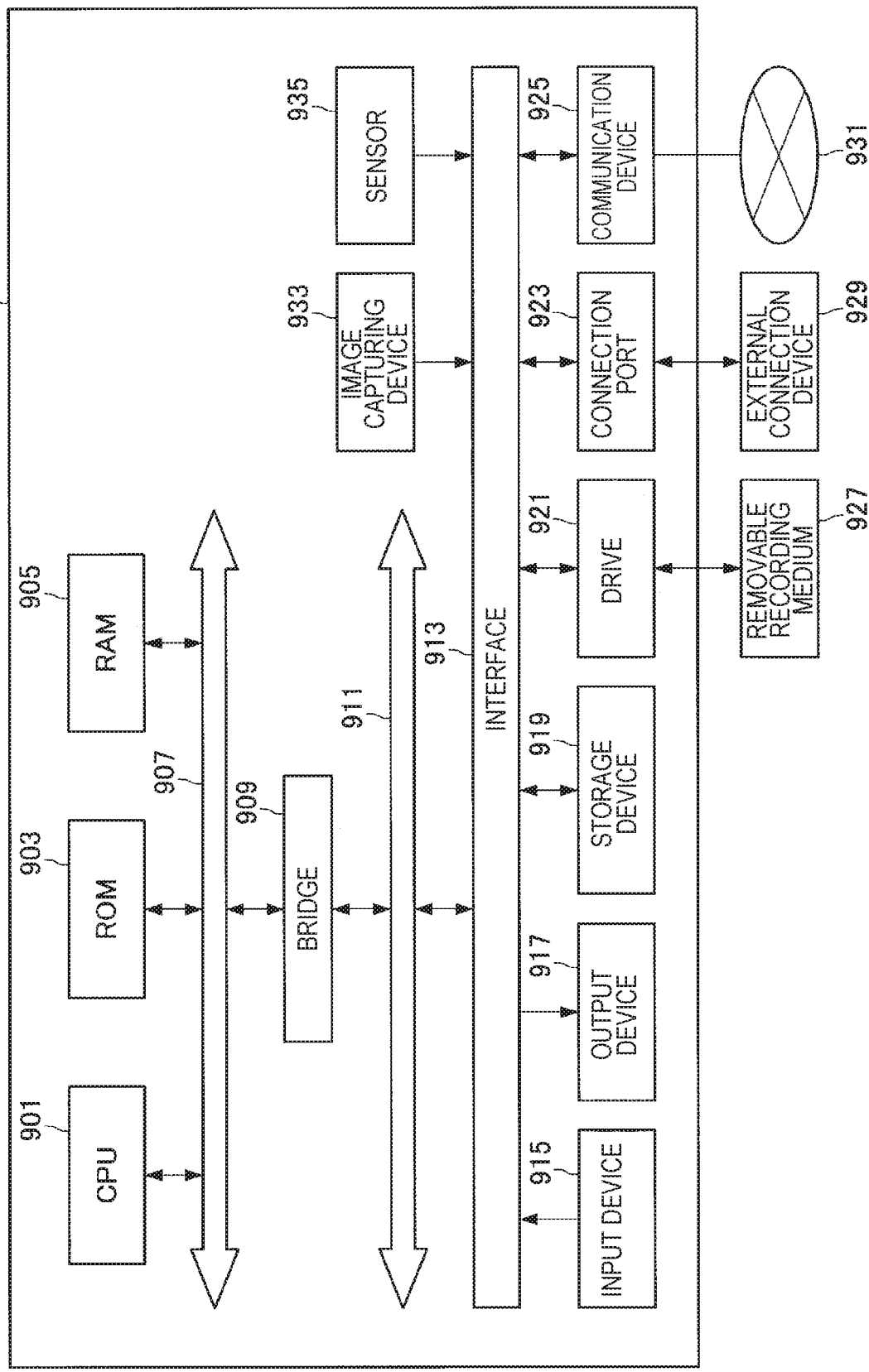
FIG. 22 is a block diagram illustrating a hardware configuration example of the information processing system.

Next, the hardware configuration of the information processing system 10 according to an embodiment of the present disclosure is described with reference to FIG. 22. FIG. 22 is a block diagram illustrating a hardware configuration example of the information processing system 10 according to an embodiment of the present disclosure.

As illustrated in FIG. 22, the information processing system 10 includes a central processing unit (CPU) 901, a read only memory (ROM) 903, and a random access memory (RAM) 905. In addition, the information processing system 10 may include a host bus 907, a bridge 909, an external bus 911, an interface 913, an input device 915, an output device 917, a storage device 919, a drive 921, a connection port 923, and a communication device 925. The information processing system 10 may further include an image capturing device 933 and a sensor 935 as necessary. In conjunction with, or in place of, the CPU 901, the information processing system 10 may have a processing circuit called a digital signal processor (DSP) or application specific integrated circuit (ASIC).

The CPU 901 functions as an arithmetic processing unit and a control device, and controls the overall operation in the information processing system 10 or a part thereof in accordance with various programs recorded in the ROM 903, the RAM 905, the storage device 919, or the removable recording medium 927. The ROM 903 stores, for example, programs and operation parameters used by the CPU 901. The RAM 905 temporarily stores, for example, programs to be used in the execution by the CPU 901 and parameters that change as appropriate in executing the programs. The CPU 901, the ROM 903, and the RAM 905 are connected with each other via a host bus 907 that is composed of an internal bus such as a CPU bus. Furthermore, the host bus 907 is connected to an external bus 911 such as peripheral component interconnect (PCI)/interface bus via a bridge 909.

The input device 915 is, for example, a device operated by a user, such as a mouse, a keyboard, a touch panel, a button, a switch, and a lever. The input device 915 may include a microphone for detecting user's voice. The input device 915 may be, for example, a remote control device using infrared rays or other radio waves, or may be an external connection device 929 such as a cellular phone conforming to the operation of the information processing system 10. The input device 915 includes an input control circuit that generates an input signal on the basis of the information input by the user and outputs it to the CPU 901. The user inputs various data to the information processing system 10 and instructs the information processing system 10 to perform a processing operation by operating the input device 915. In addition, the image capturing device 933, which will be described later, can also function as an input device by capturing the movement of the user's hand or finger, and the like. In this case, the pointing position may be determined depending on the motion of the hand or the orientation of the finger.

The output device 917 is composed of a device capable of notifying visually or audibly the user of the acquired information. The output device 917 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 917 outputs the result obtained by the processing of the information processing system 10 as a video such as a text or an image, or outputs it as audio such as a voice or sound. In addition, the output device 917 may include, for example, a light for lighting up the surroundings.

The storage device 919 is a data storage device configured as an example of a storage portion of the information processing system 10. The storage device 919 is composed of, for example, a magnetic storage device such as hard disk drives (HDDs), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information processing system 10 or externally attached thereto. The drive 921 reads the information recorded in the attached removable recording medium 927 and outputs it to the RAM 905. In addition, the drive 921 writes in the attached removable recording medium 927.

The connection port 923 is a port for directly connecting the device to the information processing system 10. The connection port 923 may be, for example, a universal serial bus (USB) port, an IEEE 1394 port, or a small computer system interface (SCSI) port. In addition, the connection port 923 may be, for example, an RS-232C port, an optical audio terminal, or high-definition multimedia interface (HDMI, registered trademark) port. The external connection device 929 is connected to the connection port 923, and thus various kinds of data can be exchanged between the information processing system 10 and the external connection device 929.

The communication device 925 is, for example, a communication interface composed of a communication device or the like, which is used to be connected to the communication network 931. The communication device 925 may be, for example, a communication card for wired or wireless local area network (LAN), Bluetooth (registered trademark), or wireless USB (WUSB). In addition, the communication device 925 may be, for example, a router for optical communication, a router for asymmetric digital subscriber line (ADSL), or a modem for various communications. The communication device 925 transmits and receives signals or the like using a predetermined protocol such as TCP/IP, for example, with the Internet or other communication devices. In addition, the communication network 931 connected to the communication device 925 is a network connected by wire or wireless, and is, for example, the Internet, home LAN, infrared communication, radio wave communication, satellite communication, or the like.

The image capturing device 933 captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 933 may capture a still image or a moving image.

The sensor 935 is, for example, various sensors such as an accelerometer, a gyro sensor, a geomagnetic sensor, a photosensor, and a sound sensor. The sensor 935 acquires information on the state of the information processing system 10 itself, such as the attitude of the casing of the information processing system 10, and information on the surrounding environment of the information processing system 10 such as brightness or noise around the information processing system 10. The sensor 935 may also include a GPS sensor, which receives global positioning system (GPS) signals and measures the latitude, longitude, and altitude of the device.

The above description is given as to the example of the hardware configuration of the information processing system 10. Each of the components described above may be configured using a general-purpose member, or may be configured with hardware dedicated to the function of each component. Such a configuration can be changed appropriately depending on the technical level at the time of implementation.

2. CONCLUSION

According to the embodiment of the present disclosure, the information processing device 140 that includes the collected sound data acquisition portion 142 that acquires collected sound data and the output controller 146 that causes the output portion to output at least whether or not the state of the collected sound data is suitable for speech recognition is provided as described above. Since the user can adjust utterance by recognizing whether or not the state of the collected sound data is suitable for the speech recognition with such a configuration, it is possible to improve accuracy of the speech recognition for the collected sound data.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The above description is given as to the modified example of the display form of the output portion 130, but the display form of the output portion 130 is not limited to the above example. The output portion 130 may be, for example, a display provided in a wearable terminal (e.g., a watch or glasses) other than the head mounted display. In addition, the output portion 130 may be, for example, a display provided in an in-vehicle navigation system. In addition, the output portion 130 may be, for example, a display used in the healthcare field.

Furthermore, it is possible to create a program for causing the hardware such as CPU, ROM and RAM incorporated in the computer to execute functions equivalent to those of the information processing system 10 as described above. In addition, a computer-readable recording medium on which the program is recorded can also be provided.

Furthermore, the output controller 146 generates display control information for displaying the display content on the output portion 130 and outputs the generated display control information to the output portion 130, and thus can control the output portion 130 so that the output portion 130 displays the display content. The contents of the display control information may be changed appropriately in accordance with the system configuration.

Specifically, the program used to implement the information processing device 140 may be, for example, a web application. In such a case, the display control information may be created using markup languages such as hypertext markup language (HTML), standard generalized markup language (SGML), and extensible markup language (XML).

The position of each component is not limited to a particular position as long as the operation of the information processing system 10 described above is performed. In one specific example, the image input portion 110, the operation input portion 115, and the sound collecting portion 120, the output portion 130, and the information processing device 140 may be provided in different devices connected via a network. In this case, the information processing device 140 corresponds to, for example, a server such as a web server or a cloud server, and the image input portion 110, the operation input portion 115, and the sound collecting portion 120 and the output portion 130 may correspond to a client connected to the server via a network.

All the components included in the information processing device 140 may not be accommodated in the same device. For example, a part of the input image acquisition portion 141, the collected sound data acquisition portion 142, the operation detection portion 143, the recognition controller 144, the speech recognition portion 145, and the output controller 146 may be present in a device that is different from the information processing device 140. For example, the speech recognition portion 145 may be present in a server that is different from the information processing device 140 that includes the input image acquisition portion 141, the collected sound data acquisition portion 142, the operation detection portion 143, the recognition controller 144, and the output controller 146.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a collected sound data acquisition portion that acquires collected sound data; and an output controller that causes an output portion to output at least whether or not a state of the collected sound data is suitable for speech recognition.

(2)

The information processing device according to (1), wherein the output controller causes the output portion to output whether or not an amount of the collected sound data is within a predetermined allowable range as whether or not the state of the collected sound data is suitable for the speech recognition.

(3)

The information processing device according to (2), wherein the output controller causes the output portion to output indication of a state in which the collected sound data is not suitable for the speech recognition when the amount of the collected sound data is less than a lower limit of the allowable range.

(4)

The information processing device according to (2) or (3), wherein the output controller causes the output portion to output indication of a state in which the collected sound data is not suitable for the speech recognition when the amount of the collected sound data is greater than an upper limit of the allowable range.

(5)

The information processing device according to any one of (2) to (4), wherein the output controller causes the output portion to output indication of a state in which the collected sound data is suitable for the speech recognition when the amount of the collected sound data is greater than a lower limit of the allowable range and the amount of the collected sound data is less than an upper limit of the allowable range.

(6)

The information processing device according to any one of (2) to (5), wherein the output controller causes the output portion to output at least either of a lower limit and an upper limit of the allowable range.

(7)

The information processing device according to any one of (1) to (6), wherein the output controller causes the output portion to output an amount of the collected sound data.

(8)

The information processing device according to (6), wherein the amount of the collected sound data includes a temporal length of the collected sound data.

(9)

The information processing device according to (6), wherein the amount of the collected sound data includes the number of phonemes extracted from the collected sound data.

(10)

The information processing device according to (6), wherein the amount of the collected sound data includes a temporal length of a speech-like part in the collected sound data.

(11)

The information processing device according to any one of (2) to (10),
wherein the output controller updates at least either of a lower limit and an upper limit of the allowable range.

(12)

The information processing device according to (11),
wherein the output controller updates at least either of the lower limit and the upper limit of the allowable range on the basis of an amount of noise.

(13)

The information processing device according to (12),
wherein the output controller updates the upper limit such that the upper limit increases as the amount of noise increases.

(14)

The information processing device according to (1),
wherein the output controller causes the output portion to output whether or not a predetermined expression indicating a beginning of a sentence or an end of a sentence is included in the collected sound data as whether or not the state of the collected sound data is suitable for the speech recognition.

(15)

The information processing device according to (14),
wherein the output controller determines whether or not the predetermined expression is included in the collected sound data on the basis of whether or not the predetermined expression is included in an intermediate result of the speech recognition when the intermediate result is obtained.

(16)

The information processing device according to any one of (1) to (15), including: a recognition controller that causes speech recognition for a part or the entirety of the collected sound data to be performed.

(17)

The information processing device according to (16),
wherein the recognition controller determines termination of a part that is a target of the speech recognition on the basis of a timing at which a period of time during which a volume is less than a predetermined volume exceeds a threshold value in the collected sound data.

(18)

The information processing device according to (17),
wherein the output controller updates the threshold value when a predetermined expression indicating a beginning of a sentence or an end of a sentence is included in the collected sound data.

(19)

A method of information processing, including:
acquiring collected sound data; and
causing an output portion to output at least whether or not a state of the collected sound data is suitable for speech recognition.

(20)

A program that causes a computer to function as an information processing device including:
a collected sound data acquisition portion that acquires collected sound data; and
an output controller that causes an output portion to output at least whether or not a state of the collected sound data is suitable for speech recognition.

REFERENCE SIGNS LIST 10 information processing system
110 image input portion
115 operation input portion
120 sound collecting portion
130 output portion
140 information processing device (controller)
141 input image acquisition portion
142 collected sound data acquisition portion
143 operation detection portion
144 recognition controller
145 speech recognition portion
146 output controller

The invention claimed is:

1. An information processing device, comprising:
circuitry configured to:
acquire an image of a user;
control a display device to display an object on a display screen;
determine an arrival direction of user voice with respect to a microphone based on analysis of the image of the user, wherein the microphone is configured to collect sound data;
control a movement of the object on the display screen based on the arrival direction;
acquire the collected sound data from the arrival direction based on a direction of the movement of the object on the display screen;
determine utterance of an expression based on the collected sound data, wherein the expression indicates one of a beginning of a sentence included in the collected sound data or an end of the sentence included in the collected sound data;
determine a state of the collected sound data based on the determination of utterance of the expression, wherein the state is one of a first state that indicates that the collected sound data is suitable for speech recognition or a second state that indicates that the collected sound data is unsuitable for the speech recognition;
control an output device to output the state of the collected sound data; and
control at least one parameter of the object based on the state of the collected sound data.

2. The information processing device according to claim 1, wherein the circuitry is further configured to control the output device to output the first state of the collected sound data based on an amount of the collected sound data that is within an allowable range.

3. The information processing device according to claim 2, wherein the circuitry is further configured to control the output device to output the second state of the collected sound data in an event the amount of the collected sound data is less than a lower limit of the allowable range.

4. The information processing device according to claim 2, wherein the circuitry is further configured to control the output device to output the second state of the collected sound data in an event the amount of the collected sound data is greater than an upper limit of the allowable range.

5. The information processing device according to claim 2, wherein the circuitry is further configured to control the output device to output the first state of the collected sound data in an event the amount of the collected sound data is greater than a lower limit of the allowable range and in an event the amount of the collected sound data is less than an upper limit of the allowable range.

6. The information processing device according to claim 2, wherein the circuitry is further configured to control the output device to output the at least one of a lower limit of the allowable range or an upper limit of the allowable range.

7. The information processing device according to claim 6, wherein the amount of the collected sound data includes a temporal length of the collected sound data.

8. The information processing device according to claim 6, wherein the amount of the collected sound data includes a number of phonemes extracted from the collected sound data.

9. The information processing device according to claim 6, wherein the amount of the collected sound data includes a temporal length of a speech-like part in the collected sound data.

10. The information processing device according to claim 2, wherein
the circuitry is further configured to update at least one of a lower limit of the allowable range or an upper limit of the allowable range based on an amount of noise in the collected sound data, and
the allowable range is a range suitable for the speech recognition.

11. The information processing device according to claim 1, wherein the circuitry is further configured to control the output device to output an amount of the collected sound data.

12. The information processing device according to claim 1, wherein the circuitry is further configured to increase an upper limit based on an increase in an amount of noise.

13. The information processing device according to claim 1, wherein
the circuitry is further configured to control the output device to output the expression as one of the first state of the collected sound data or the second state of the collected sound data.

14. The information processing device according to claim 13,
wherein the circuitry is further configured to determine whether the collected sound data includes the expression based on an intermediate result of the speech recognition.

15. The information processing device according to claim 1, wherein the circuitry is further configured to cause the speech recognition for at least one of a part of the collected sound data or an entirety of the collected sound data to be performed.

16. The information processing device according to claim 15,
wherein the circuitry is further configured to determine termination of the part of the collected sound data that is a target of the speech recognition, based on a determination that a volume in the collected sound data is less than a threshold volume for a time period that exceeds a threshold value.

17. The information processing device according to claim 16, wherein the circuitry is further configured to update the threshold value based on the expression.

18. The information processing device according to claim 1, wherein the circuitry is further configured to determine the arrival direction of the user voice based on one of a direction or an orientation of a user finger indicated in the image of the user.

19. The information processing device according to claim 1, wherein the at least one parameter of the object comprises at least one of a shape, a transparency, a color, a size, or a motion of the object.

20. A method, comprising:
acquiring an image of a user;
controlling a display device to display an object on a display screen;
determining an arrival direction of user voice with respect to a microphone, based on analysis of the image of the user, wherein the microphone is configured to collect sound data;
controlling a movement of the object on the display screen based on the arrival direction;
acquiring the collected sound data from the arrival direction based on a direction of the movement of the object on the display screen;
determining utterance of an expression based on the collected sound data, wherein the expression indicates one of a beginning of a sentence included in the collected sound data or an end of the sentence included in the collected sound data;
determining a state of the collected sound data based on the determination of utterance of the expression, wherein the state is one of a first state that indicates that the collected sound data is suitable for speech recognition or a second state that indicates that the collected sound data is unsuitable for the speech recognition;
controlling an output device to output the state of the collected sound data; and
controlling at least one parameter of the object based on the collected sound data.

21. A non-transitory computer-readable medium having stored thereon, computer-executable instructions, which when executed by a computer, cause the computer to execute operations, the operations comprising:
acquiring an image of a user;
controlling a display device to display an object on a display screen;
determining an arrival direction of user voice with respect to a microphone, based on analysis of the image of the user, wherein the microphone is configured to collect sound data;
controlling a movement of the object on the display screen based on the arrival direction;
acquiring the collected sound data from the arrival direction based on a direction of the movement of the object on the display screen;
determining utterance of an expression based on the collected sound data, wherein the expression indicates one of a beginning of a sentence included in the collected sound data or an end of the sentence included in the collected sound data;
determining a state of the collected sound data based on the determination of utterance of the expression, wherein the state is one of a first state that indicates that the collected sound data is suitable for speech recognition or a second state that indicates that the collected sound data is unsuitable for the speech recognition;
controlling an output device to output the state of the collected sound data; and
controlling at least one parameter of the object based on the collected sound data.

* * * * *